US008230064B2

(12) United States Patent
Yanagi

(10) Patent No.: US 8,230,064 B2
(45) Date of Patent: Jul. 24, 2012

(54) DATA PROVIDING SYSTEM AND DATA PROVIDING APPARATUS

(75) Inventor: Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 777 days.

(21) Appl. No.: 12/343,652

(22) Filed: Dec. 24, 2008

(65) Prior Publication Data

US 2009/0168101 A1 Jul. 2, 2009

(30) Foreign Application Priority Data

Dec. 28, 2007 (JP) ................................ 2007-338994

(51) Int. Cl.
*G06F 15/16* (2006.01)

(52) U.S. Cl. ........ 709/225; 709/203; 709/219; 709/229; 709/245; 709/250; 715/733

(58) Field of Classification Search .................. 709/203, 709/217, 245, 219, 225, 229, 250
See application file for complete search history.

(56) References Cited

U.S. PATENT DOCUMENTS

| | | | | |
|---|---|---|---|---|
| 5,612,889 | A * | 3/1997 | Pintsov et al. | 700/226 |
| 5,841,970 | A * | 11/1998 | Tabuki | 726/2 |
| 5,987,232 | A * | 11/1999 | Tabuki | 726/5 |
| 6,137,480 | A | 10/2000 | Shintani | |
| 6,515,575 | B1 | 2/2003 | Kataoka | |
| 6,735,628 | B2 * | 5/2004 | Eyal | 709/223 |
| 6,801,962 | B2 | 10/2004 | Taniguchi et al. | |
| 7,089,309 | B2 * | 8/2006 | Ramaley et al. | 709/226 |
| 7,113,299 | B2 | 9/2006 | Suzuki et al. | |

(Continued)

FOREIGN PATENT DOCUMENTS

EP 1248434 10/2002

(Continued)

OTHER PUBLICATIONS

European Search Report Application No. 08254149.1 dated May 12, 2009.

(Continued)

*Primary Examiner* — Michael Won
(74) *Attorney, Agent, or Firm* — Banner & Witcoff, Ltd.

(57) ABSTRACT

A data providing system is provided with a data providing apparatus, a data utilizing apparatus configured to be connected with the data providing apparatus in a communicable manner, and a communication apparatus configured to be connected with the data providing apparatus in a communicable manner. The data utilizing apparatus is configured to send an identification information-sending request to the data providing apparatus, output identification information sent from the data providing apparatus, send the identification information to the data providing apparatus, and utilize data sent from the data providing apparatus. The communication apparatus is configured to allow a user to input the identification information and to designate data specifying information, and send the input identification information and the designated data specifying information to the data providing apparatus. The data providing apparatus is configured to send the identification information to the data utilizing apparatus in accordance with the identification information-sending request sent from the data utilizing apparatus, store the sent identification information, store an association of the identification information and the data specifying information sent from the communication apparatus on a condition that the identification information sent from the communication apparatus has been stored, and send data to the data utilizing apparatus. The data is specified by the data specifying information associated with the identification information sent from the data utilizing apparatus.

12 Claims, 23 Drawing Sheets

U.S. PATENT DOCUMENTS

| | | | | |
|---|---|---|---|---|
| 7,126,706 | B2 | 10/2006 | Taniguchi | |
| 7,284,059 | B2 * | 10/2007 | Isozu | 709/227 |
| 7,333,245 | B2 | 2/2008 | Peter et al. | |
| 7,426,049 | B2 | 9/2008 | Peter et al. | |
| 7,590,857 | B2 | 9/2009 | Sumio | |
| 7,757,093 | B2 | 7/2010 | Hibino et al. | |
| 7,839,521 | B2 | 11/2010 | Bard et al. | |
| 2002/0016921 | A1 | 2/2002 | Olsen et al. | |
| 2002/0165916 | A1 * | 11/2002 | Kitamura | 709/203 |
| 2002/0177433 | A1 | 11/2002 | Bravo et al. | |
| 2003/0011809 | A1 | 1/2003 | Suzuki et al. | |
| 2003/0044009 | A1 | 3/2003 | Dathathraya | |
| 2003/0054766 | A1 | 3/2003 | Clough et al. | |
| 2003/0101342 | A1 | 5/2003 | Hansen | |
| 2003/0110234 | A1 * | 6/2003 | Egli et al. | 709/217 |
| 2003/0151768 | A1 | 8/2003 | Iida | |
| 2003/0182438 | A1 | 9/2003 | Tenenbaum | |
| 2004/0015589 | A1 * | 1/2004 | Isozu | 709/227 |
| 2004/0024844 | A1 | 2/2004 | Holmstead | |
| 2004/0156069 | A1 | 8/2004 | Kurotsu et al. | |
| 2004/0190049 | A1 | 9/2004 | Itoh | |
| 2005/0198291 | A1 | 9/2005 | Hull et al. | |
| 2005/0206950 | A1 | 9/2005 | Ushiro et al. | |
| 2005/0265766 | A1 | 12/2005 | Ohmura | |
| 2006/0082816 | A1 | 4/2006 | Daniel et al. | |
| 2006/0273908 | A1 * | 12/2006 | Brahmbhatt et al. | 340/572.4 |
| 2007/0012163 | A1 * | 1/2007 | Ijichi | 84/600 |
| 2007/0035763 | A1 | 2/2007 | Bard et al. | |

FOREIGN PATENT DOCUMENTS

| | | |
|---|---|---|
| GB | 2403108 | 12/2004 |
| JP | 10-240368 | 9/1998 |
| JP | 2000-003336 | 1/2000 |
| JP | 2005-309860 | 11/2005 |
| WO | 01/17310 | 3/2001 |

OTHER PUBLICATIONS

European Search Report Application No. 08254152.5 dated May 11, 2009.

Office action for related U.S. Appl. No. 12/343,581 mailed Apr. 27, 2011.

Office action for co-pending commonly assigned U.S. Appl. No. 12/343,581, mailed Nov. 18, 2010.

Co-Pending, Commonly Assigned U.S. Appl. No. 12/343,581, filed Dec. 24, 2008.

* cited by examiner

FIG. 5

User Data Storage Area 84

| | User ID (100) | Password (102) |
|---|---|---|
| 110 | user_A | abcdefghi |
| 112 | user_B | 12345678 |

FIG. 6

Client Data Storage Area 86

| | MAC Address (120) | Spec (122) |
|---|---|---|
| 130 | xx-xx-xx-xx-xx-xx | A4 : mono |
| 132 | yy-yy-yy-yy-yy-yy | A3,B4,A4 : color |
| 134 | zz-zz-zz-zz-zz-zz | A4 : color |

FIG. 7

Service Data Storage Area 88

| | 140 | 142 | 144 | 146 | 148 | 150 |
|---|---|---|---|---|---|---|
| | Service ID | MAC Address | User ID | PIN Code | Status | Service Data |
| 160 | abcd0001 | xx-xx-xx-xx-xx-xx | user_A | | DISPOSED | Data A |
| 162 | abcd0002 | xx-xx-xx-xx-xx-xx | user_B | 1234 | DISPOSED | Data B |
| 164 | abcd0003 | xx-xx-xx-xx-xx-xx | user_B | | DISPOSED | Data C |
| 166 | abcd0004 | yy-yy-yy-yy-yy-yy | user_A | 9876 | ENABLE | |
| 168 | abcd0005 | zz-zz-zz-zz-zz-zz | user_C | | CREATED | |
| | | | | | | |

DATA PROVIDING SYSTEM AND DATA PROVIDING APPARATUS

CROSS-REFERENCE TO RELATED APPLICATION

This application claims priority to Japanese Patent Application No. 2007-338994, filed on Dec. 28, 2007, the contents of which are hereby incorporated by reference into the present application.

BACKGROUND OF THE INVENTION

1. Field of the Invention

The present invention relates to a system for providing data from a device to another device.

2. Description of the Related Art

Systems (for example, internet communication systems) for providing data from a device to another device are widespread. An example of this type of data providing system is taught in Japanese Patent Application Publication No. 2005-309896. In the technique of this document, the data is authenticated before being provided.

BRIEF SUMMARY OF THE INVENTION

The present inventors are developing a device that can be used in common by a plurality of users, and that is utilized to receive data from another device. A novel data providing system that can suitably be utilized as a system for providing data to a device to be used in common by a plurality of users is taught in the present specification.

In the case of constructing a system for providing data to a device to be used in common by a plurality of users, the system must be designed with this usage in common taken into consideration. For example, the data to be provided to the device may differ for each user. For this reason, it is preferred that a system is constructed in which each user can designate the data to be provided to the device. Further, the system may be inconvenient since another user is prevented from utilizing the device in the case where a specific user occupies the device over a long period. The data providing system taught in the present specification has been created with the above state of affairs taken into consideration, and is provided with the configuration described below.

A data providing system taught in the present specification may comprise a data providing apparatus, a data utilizing apparatus configured to be connected with the data providing apparatus in a communicable manner, and a communication apparatus configured to be connected with the data providing apparatus in a communicable manner. The term "data providing apparatus" may refer to a structure independently configured from the data utilizing apparatus and the communication apparatus, and includes any device capable of providing data to the data utilizing apparatus. Examples of the data providing apparatus are a personal computer, a server, a scanner, etc. Further, the term "data utilizing apparatus" may refer to a structure independently configured from the data providing apparatus and the communication apparatus, and includes any device capable of utilizing data sent from the data providing apparatus. Examples of the data utilizing apparatus are a personal computer, a server, a printer, a scanner, a multi-function device (composite device), etc. Further, the term "communication apparatus" may refer to a structure independently configured from the data providing apparatus and the data utilizing apparatus, and includes any device capable of communicating with the data providing apparatus. Examples of the communication apparatus are a personal computer, a portable terminal (portable telephone, personal digital assistant (PDA)), etc.

The data utilizing apparatus may comprise an identification information request device, an identification information output device, a utilizing apparatus-side identification information sending device, and a data utilizing device. The identification information request device is configured to send an identification information-sending request to the data providing apparatus. Moreover, in the case where the identification information request device has input predetermined information to the data utilizing apparatus (for example, in the case where a user has performed a predetermined operation, or in the case where a predetermined signal has been input from the exterior, or the like), the identification information-sending request may be sent to the data providing apparatus. The identification information output device outputs identification information sent from the data providing apparatus. The term "output" should be interpreted in its broadest sense. Examples of "output" are printing, showing on a display, outputting sound, etc. The term "output" can also be described as "outputting in a format capable of being understood by a user". The utilizing apparatus-side identification information sending device sends the identification information to the data providing apparatus. The data utilizing device utilizes the data sent from the data providing apparatus. The term "utilizes the data" should be interpreted in its broadest sense. Examples of "utilize the data" are outputting the data (showing on a display, printing, etc.), storing the data, performing a process on the data, performing a calculation utilizing the data, changing a setting in accordance with the data, and the like.

The communication apparatus may comprise an identification information input device, a data designation device, and a communication apparatus-side identification information sending device. The identification information input device allows a user to input the identification information. The data designation device allows the user to designate data specifying information. The term "data specifying information" should be interpreted in its broadest sense, and includes any information that is capable of specifying data. Examples of "data specifying information" are information of the format of the data, information of the output type of the data (for example, information showing printing method), information of the location in which the data is stored (for example, a URL), information of characteristics of the data, and the like. The communication apparatus-side identification information sending device is configured to send, to the data providing apparatus, the identification information input to the identification information input device and the data specifying information designated in the data designation device. Moreover, the communication apparatus-side identification information sending device may send the identification information and the data specifying information to the data providing apparatus simultaneously, or may send the identification information and the data specifying information at differing timings. In the latter case, the data specifying information may for example be sent on a condition that a predetermined condition has been fulfilled after the identification information has been sent (for example, on a condition that the identification information has been stored in a providing apparatus-side identification information storage device).

The data providing apparatus may comprise a providing apparatus-side identification information sending device, the providing apparatus-side identification information storage device, a first storage control device, and a data sending device. The providing apparatus-side identification information sending device is configured to send the identification information to the data utilizing apparatus in accordance with the identification information-sending request that is sent from the data utilizing apparatus. The providing apparatus-side identification information storage device is configured to store the identification information that is sent by the providing apparatus-side identification information sending device. On a condition that the identification information sent from the communication apparatus is being stored in the providing apparatus-side identification information storage device, the first storage control device stores, in the providing apparatus-side identification information storage device, an association of the aforementioned identification information and the data specifying information that is sent from the communication apparatus. Moreover, the first storage control device may associate data specified by the aforementioned data specifying information (such a specified data may be, e.g. data being stored by the data providing apparatus or data downloaded from the exterior, etc.) with the identification information, and store this combination of data. This case is equivalent to storing, in the providing apparatus-side identification information storage device, an association of the identification information and the data specifying information sent from the communication apparatus. The data sending device is configured to send data to the data utilizing apparatus. The aforementioned data is specified by the data specifying information associated with the identification information sent from the data utilizing apparatus.

In the data providing system, the data is provided from the data providing apparatus to the data utilizing apparatus in the following sequence:

(1) An identification information-sending request is sent to the data providing apparatus by the identification information request device of the data utilizing apparatus. In accordance with the request, the identification information is sent to the data utilizing apparatus by the providing apparatus-side identification information sending device of the data providing apparatus. It should be noted that, upon sending the identification information in response to the identification information-sending request, the providing apparatus-side identification information storage device of the data providing apparatus stores the identification information. On the other hand, the identification information that had been received by the data utilizing apparatus is output by the identification information output device of the aforesaid apparatus. The user can thereby obtain the identification information. The identification information that had been communicated as in above is assumed to be acknowledged only by the user.

(2) After obtaining the identification information, the user can input the identification information known only by him/herself to the identification information input device of the communication apparatus. Since a third party cannot learn of the identification information, only the legitimate user can input the identification information and perform the following operations. Further, the user can utilize the data designation device of the communication apparatus to perform an operation to designate data specifying information that specifies data to be provided to the data utilizing apparatus. After having obtained the identification information from the data utilizing apparatus, and during when performing the present operation on the communication apparatus, the user can be away from the data utilizing apparatus. As a result, it is possible to prevent the data utilizing apparatus from being occupied by a specific user over a long period.

(3) The identification information and the data specifying information are sent to the data providing apparatus by the communication apparatus-side identification information sending device of the communication apparatus. On a condition that the identification information is being stored in the data providing apparatus-side identification information storage device, the data providing apparatus stores an association of the identification information and the data specifying information. This may also be said as the data providing apparatus stores an association of the identification information and the data specifying information in a case where the identification information sent from the communication apparatus coincides with one of the identification information that is stored in the data providing apparatus. In effect of having this condition, only the legitimate user who is capable of knowing the identification information that had been sent from the data providing apparatus to the data utilizing apparatus can store the association of the identification information and the data specifying information in the data providing apparatus.

(4) The identification information is sent to the data providing apparatus by the utilizing apparatus-side identification information sending device of the data utilizing apparatus. Moreover, the data utilizing apparatus may store the identification information sent from the data providing apparatus and may send this identification information to the data providing apparatus. Alternatively, the data utilizing apparatus may allow the user to input the identification information, and may send the input identification information to the data providing apparatus. When the identification information has been sent from the data utilizing apparatus to the data providing apparatus, the data providing apparatus sends, to the data utilizing apparatus, the data specified by the data specifying information that is associated with this identification information. After having been sent to the data utilizing apparatus, this data is utilized by the data utilizing device of the data utilizing apparatus. According to the aforementioned configuration and operation, the data designated by the user is provided to the data utilizing apparatus and is thereby utilized.

According to the system described above, the data designated by the user can be provided to the data utilizing apparatus. Further, it is possible to prevent the data utilizing apparatus from being occupied over a long period by a specific user. This technique is suitable for use in a system for providing data to a device (for example, the data utilizing apparatus as described above) that is shared by a plurality of users.

BRIEF DESCRIPTION OF THE DRAWINGS

FIG. 5 shows an example of the stored contents of a user data storage area.

FIG. 6 shows an example of the stored contents of a client data storage area.

FIG. 7 shows an example of the stored contents of a service data storage area.

DETAILED DESCRIPTION OF THE PREFERRED EMBODIMENTS

First Embodiment

Figure 1:
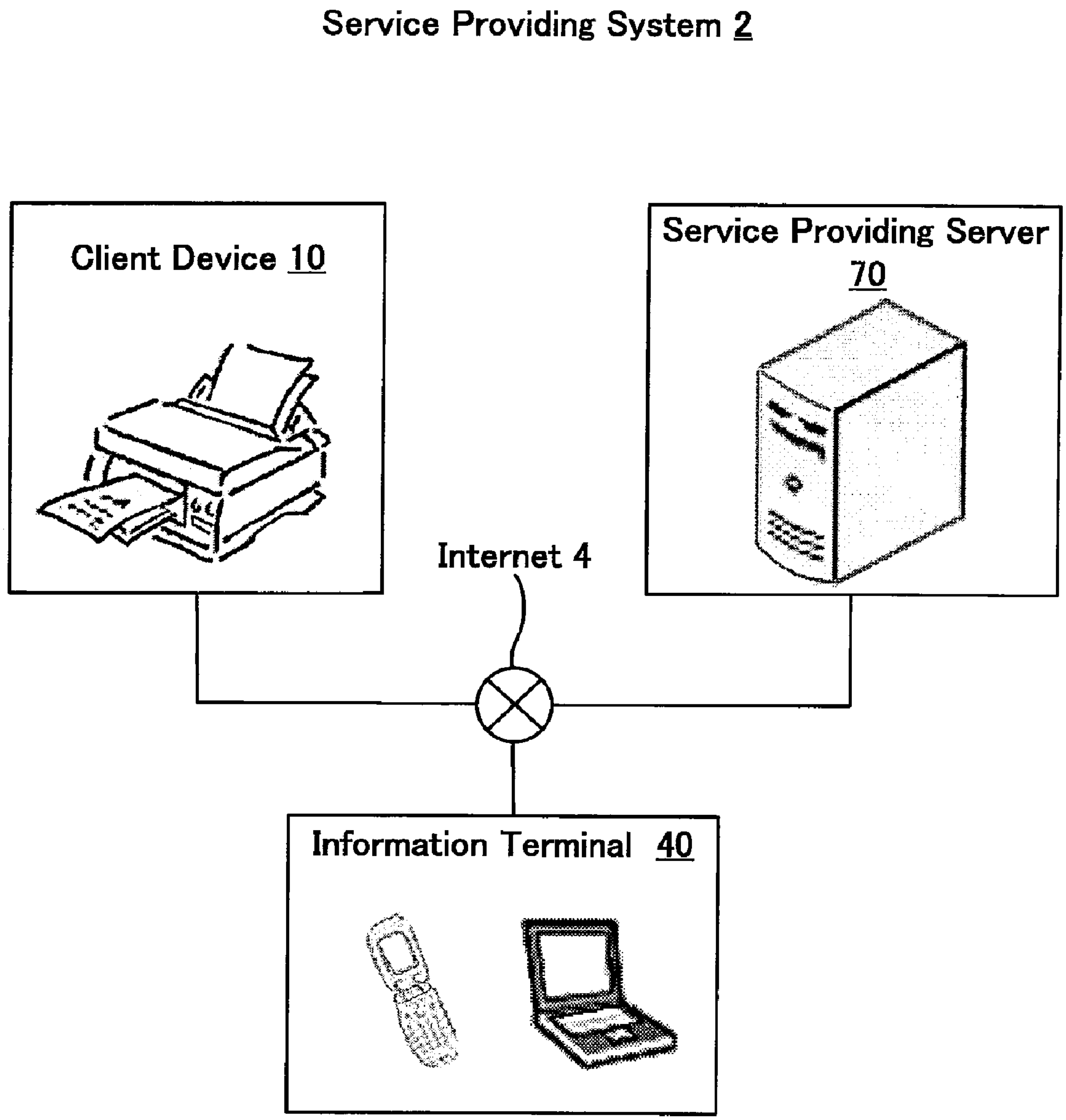
FIG. 1 shows the configuration of a service providing system.

The embodiment will be described with reference to the figures. FIG. 1 shows a service providing system 2, which is an unlimiting example of a "data providing system", of the present embodiment. The service providing system 2 comprises a client device 10, an information terminal 40, a service providing server 70, etc. The term "service" hereinbelow includes transmission of "data", e.g. images, letter strings, application programs and the like, that can be processed by the client device 10 by using its function. Note that the term "service" should be construed in its broadest sense. The client device 10, which is an unlimiting example of a "data utilizing apparatus", is located in a public location, and is used in common by a plurality of users. The client device 10 is a device that receives services provided from the service providing server 70. The client device 10 of the present embodiment is, for example, a printer device (this includes a facsimile, a copier, a multi-function device, etc.). Although only one client device 10 is shown in FIG. 1, a plurality of client devices may be present. The information terminal 40, which is an unlimiting example of a "communication apparatus", is a terminal utilized by each of the users (for example, a terminal owned by each of the users). The information terminal 40 of the present embodiment is, for example, a portable terminal, a desktop personal computer, etc. Examples of a portable terminal are a portable telephone, a personal digital assistant (PDA), a notebook personal computer, etc. Although only one information terminal 40 is shown in FIG. 1, a plurality of information terminals may be present. The service providing server 70, which is an unlimiting example of a "data providing apparatus", is a device for providing services to the client device 10. The devices 10, 40, and 70 are connected with an internet 4 via a LAN or a communication circuit of an internet circuit, or the like. The service providing system 2 is an example of a system in which various services that the service providing server 70 comprises can be utilized by the client device 10, whereas the service utilization involves user operations not only on the client device 10, but also on the information terminal 40 that are in most cases allowed with private use of the individual users. In a case where a large number of services are available in the service providing server 70, a user may desire to take his/her time on selecting the most favorable service. However, due to the objective character of the client device 10 laid out to the public, its monopolistic use by one user over a long period of time should be avoided. According to the system as hereinbelow provided, the user is enabled to designate the desired service (while taking as much time as one wishes) by using the information terminal 40, and then utilize the client device 10 to enjoy the desired service. This system is very much suitable to such cases, and provides a new and useful solution to the aforementioned conflict.

(Configuration of the Client Device)

Figure 2:
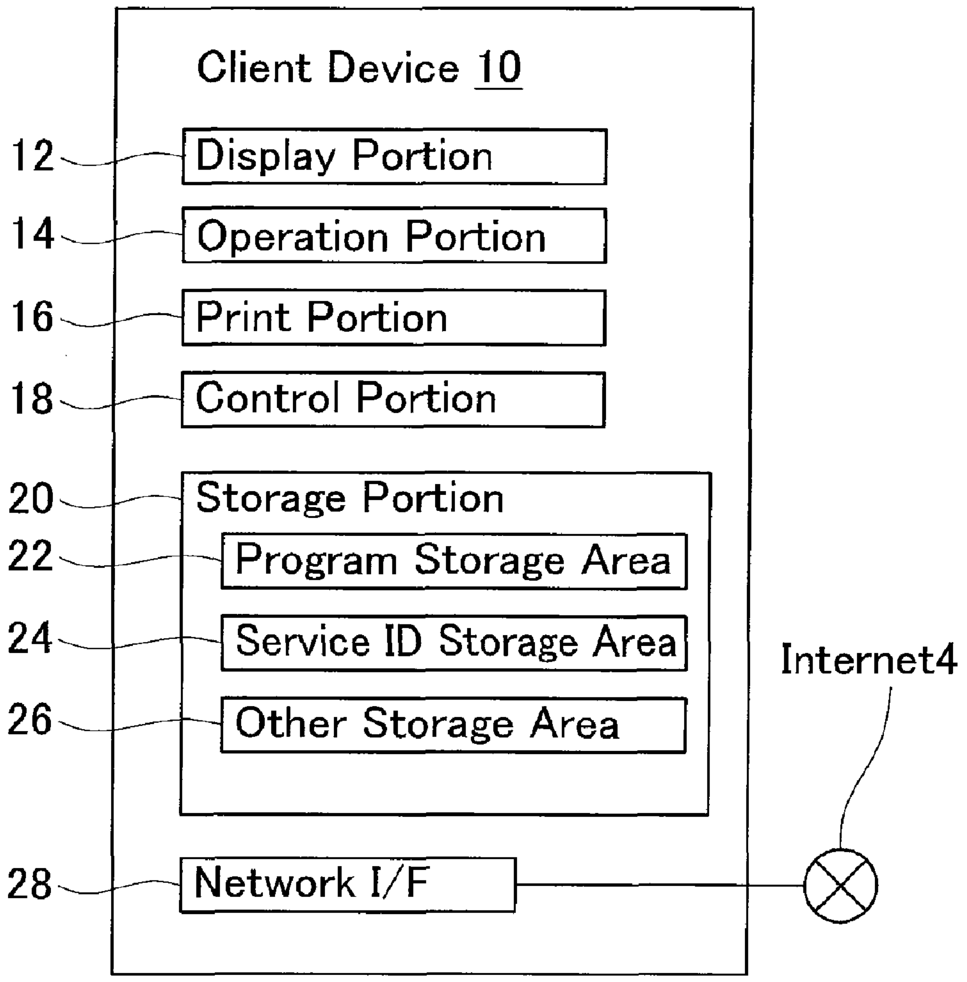
FIG. 2 shows the configuration of a client device.

FIG. 2 shows the configuration of the client device 10. The client device 10 is capable of performing internet communication. The client device 10 comprises a display portion 12, an operation portion 14, a print portion 16, a control portion 18, a storage portion 20, a network I/F 28, etc. The display portion 12 is capable of displaying information. The operation portion 14 consists of a plurality of keys. A user can input information or commands to the client device 10 by operating the operation portion 14. The print portion 16 is capable of printing data onto a print medium. The print portion 16 is capable of printing data (service) sent, for example, from the service providing server 70. This may also be said that the client device 10 is capable of processing the service provided from the service providing server 70 by utilizing its printing function. The control portion 18 performs processes in accordance with a program stored in the storage portion 20. The contents of the processes performed by the control portion 18 will be described in detail later.

The storage portion 20 consists of a ROM, EEPROM, RAM, etc. The storage portion 20 comprises a program storage area 22, a service ID storage area 24, and an other storage area 26. The program storage area 22 stores the program executed by the control portion 18. This program may be installed by the manufacturer at the time of manufacturing the client device 10, or may be downloaded from the internet 4. The service ID storage area 24 stores service IDs (which are examples of an "identification information") sent from the service providing server 70. The service ID will be described in detail later. The storage area 26 is capable of storing data. The contents of the data stored in the storage area 26 will be described later as required.

The network I/F 28 is connected with the internet 4. The client device 10 is capable of communicating with the service providing server 70 via the network I/F 28 and the internet 4.

(Configuration of the Information Terminal)

Figure 3:
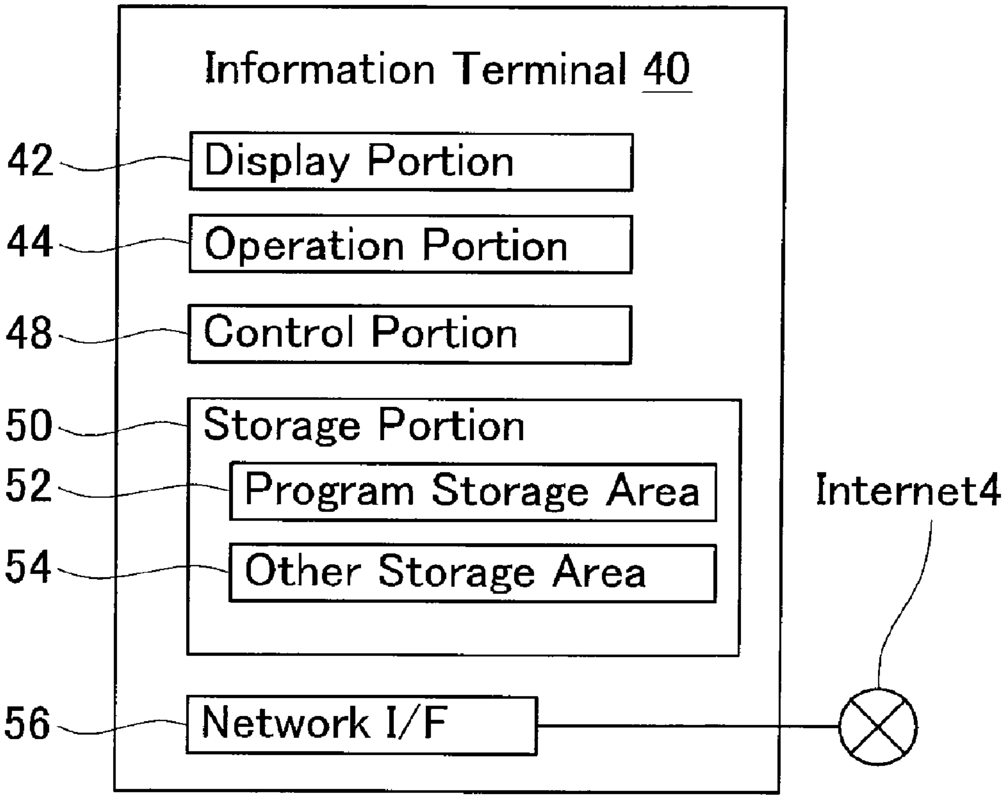
FIG. 3 shows the configuration of an information terminal.

FIG. 3 shows the configuration of the information terminal 40. The information terminal 40 is capable of performing internet communication. The information terminal 40 comprises a display portion 42, an operation portion 44, a control portion 48, a storage portion 50, a network I/F 56, etc. The display portion 42 is capable of displaying information. In the case where the information terminal 40 is, for example, a personal computer, the operation portion 44 may consist of a keyboard or a mouse. In the case where the information terminal 40 is, for example, a portable telephone, the operation portion 44 may consist of a plurality of keys. The user can input information or commands to the information terminal 40 by operating the operation portion 44. Though will be described in detail below, the information terminal 40 is utilized in the operation of utilizing the service of the service providing server 70 in the client device 10. The control portion 48 performs processes in accordance with the program stored in the storage portion 50. The contents of the processes performed by the control portion 48 will be described in detail later.

The storage portion 50 consists of a ROM, EEPROM, RAM, etc. The storage portion 50 comprises a program storage area 52 and an other storage area 54. The program storage area 52 stores a program executed by the control portion 48. This program may be installed by the manufacturer at the time of manufacturing the information terminal 40, or may be downloaded from the internet 4. The storage area 54 is capable of storing data. The contents of the data stored in the storage area 54 will be described later as required.

The network I/F 56 is connected with the internet 4. The information terminal 40 is capable of communicating with the service providing server 70 via the network I/F 56 and the internet 4.

(Configuration of the Service Providing Server)

Figure 4:
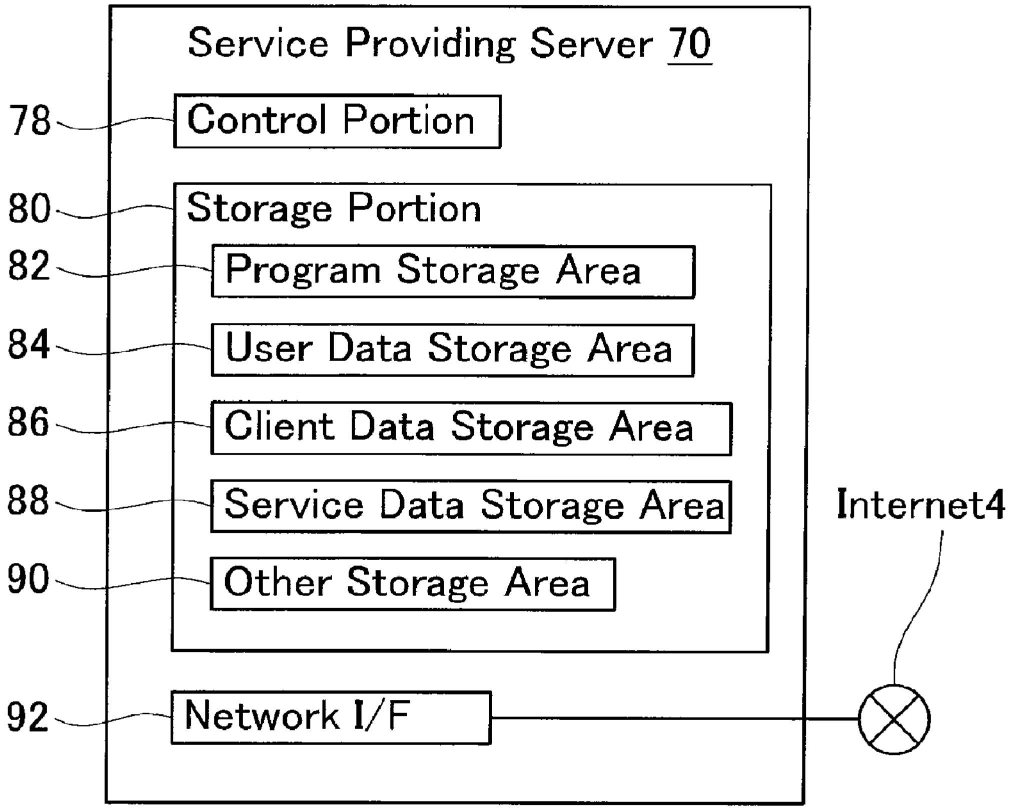
FIG. 4 shows the configuration of a service providing server.

FIG. 4 shows the configuration of the service providing server 70. The service providing server 70 is capable of performing internet communication. The service providing server 70 comprises a control portion 78, a storage portion 80, a network I/F 92, etc. The control portion 78 performs processes in accordance with a program stored in the storage portion 80. The contents of the processes executed by the control portion 78 will be described in detail later.

The storage portion 80 consists of a ROM, EEPROM, RAM, etc. The storage portion 80 comprises a program storage area 82, a user data storage area 84, a client data storage area 86, a service data storage area 88, and an other storage area 90. The program storage area 82 stores the program executed by the control portion 78. This program may be installed on the service providing server 70 from a program storing medium, or may be downloaded from the internet 4.

FIG. 5 shows an example of the stored contents of the user data storage area 84. The user data storage area 84 is capable of storing combination data 110, 112 and the like for each of a plurality of users. Each of the combination data 110 and 112 is an association of an user ID 100 and a password 102. In the present embodiment, the combination data are predeterminedly stored in the user data storage area 84. For example, a user desiring to use the service providing server 70 may in advance notify an administrator of the service providing server 70 of the user ID and the password. In this case, the administrator may store the user ID and the password (i.e. one item of combination data) in the user data storage area 84 by accessing the service providing server 70. Alternatively, the user may store the user ID and the password (i.e. one item of combination data) in the user data storage area 84 by accessing the service providing server 70 him/herself In either case, the service providing server 70 of the present embodiment is capable of recognizing the individual user based on the aforementioned combination data.

FIG. 6 shows an example of the stored contents of the client data storage area 86. The client data storage area 86 is capable of storing combination data 130 to 134 and the like for each of a plurality of client devices 10. Each of the items of combination data 130 to 134 is an association of a MAC address 120 of the client device 10 and a spec 122 of the client device 10. For example, the combination data 130 includes the MAC address "xx-xx-xx-xx-xx-xx" and the spec "A4, mono". This means that the client device 10 having the MAC address "xx-xx-xx-xx-xx-xx" is capable of mono color printing on an A4 size print medium. In other words, this client device 10 is not capable of printing on a print medium having a size other than A4, and is not capable of performing color printing. For example, the administrator of the service providing server 70 may store the MAC address and the spec (i.e. one item of combination data) in the client data storage area 86 by accessing the service providing server 70. The combination data as above are predeterminedly stored in the client data storage area 86. For example, each of the combination data may be provided from each of the client devices 10 when the client device 10 enters into a state (e.g. when it is turned ON) capable of communicating with the service providing server 70. The service providing server 70 of the present embodiment is capable of recognizing the individual client device 10 and its spec based on the aforementioned combination data.

FIG. 7 shows an example of the stored contents of the service data storage area 88. The service data storage area 88 is capable of storing a plurality of items of combination data 160 to 168 and the like. Each of the items of combination data 160 to 168 is an association of service ID 140, MAC address 142, user ID 144, PIN code 146, status 148, and service data 150. The manner in which the service data is stored in the service data storage area 88 will be described in detail later. Moreover, a storage area 90 shown in FIG. 4 is capable of storing various data. The storage area 90 may store the actual data to be provided as the contents of the services provided by the service providing server 70. The contents of the data stored in the storage area 90 will be described later as required.

The network I/F 92 shown in FIG. 4 is connected with the internet 4. The service providing server 70 is capable of communicating with the client device 10 and the information terminal 40 via the network I/F 92 and the internet 4.

(Main Process of the Client Device)

Figure 8:
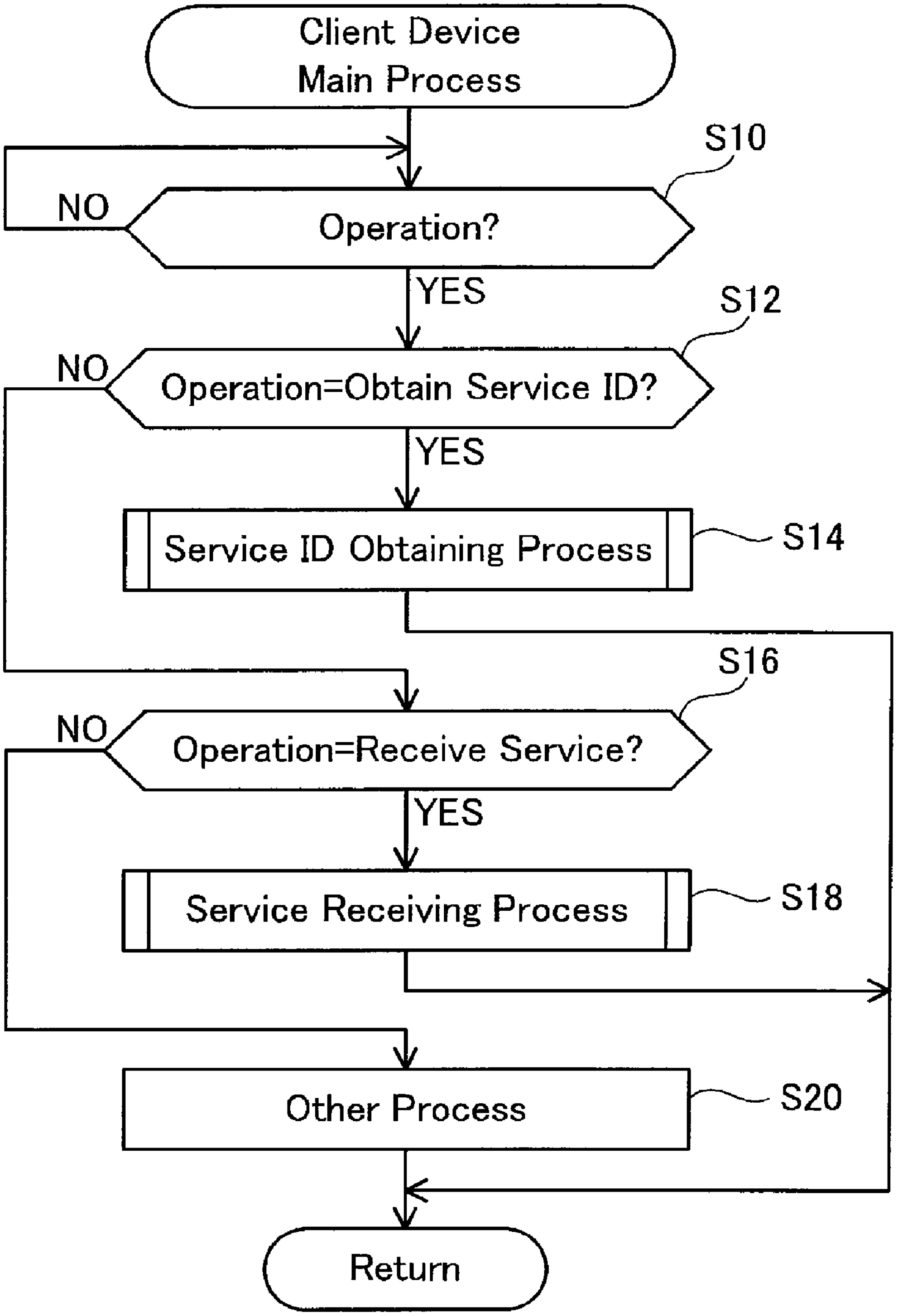
FIG. 8 shows a flow chart of a main process of the client device.

Next, the contents of the process performed by the client device 10 will be described. The process below is performed by the control portion 18 (see FIG. 2) of the client device 10. FIG. 8 shows a flow chart of the main process of the client device 10. The user can access the service providing server 70 by operating the operation portion 14 (see FIG. 2) of the client device 10 (for example, by inputting the address of the service providing server 70). The user can send requests to the service providing server 70 by operating the operation portion 14.

The control portion 18 of the client device 10 monitors the user's operation of the operation portion 14 (S10). In the case of YES in S10, the control portion 18 determines whether the operation performed on the operation portion 14 is an operation to obtain the service ID (S12). In the case of YES in S12, the control portion 18 performs a service ID obtaining process (S14). The contents of the service ID obtaining process will be described in detail later. In the case of NO in S12, the control portion 18 determines whether the operation performed on the operation portion 14 is an operation to receive service (S 16). In the case of YES in S16, the control portion 18 performs a service receiving process (S18). The contents of the service receiving process will be described in detail later. In the case of NO in S16, the control portion 18 performs a process in accordance with the operation performed on the operation portion 14 (S20).

(Service ID Obtaining Process of the Client Device)

Figure 9:
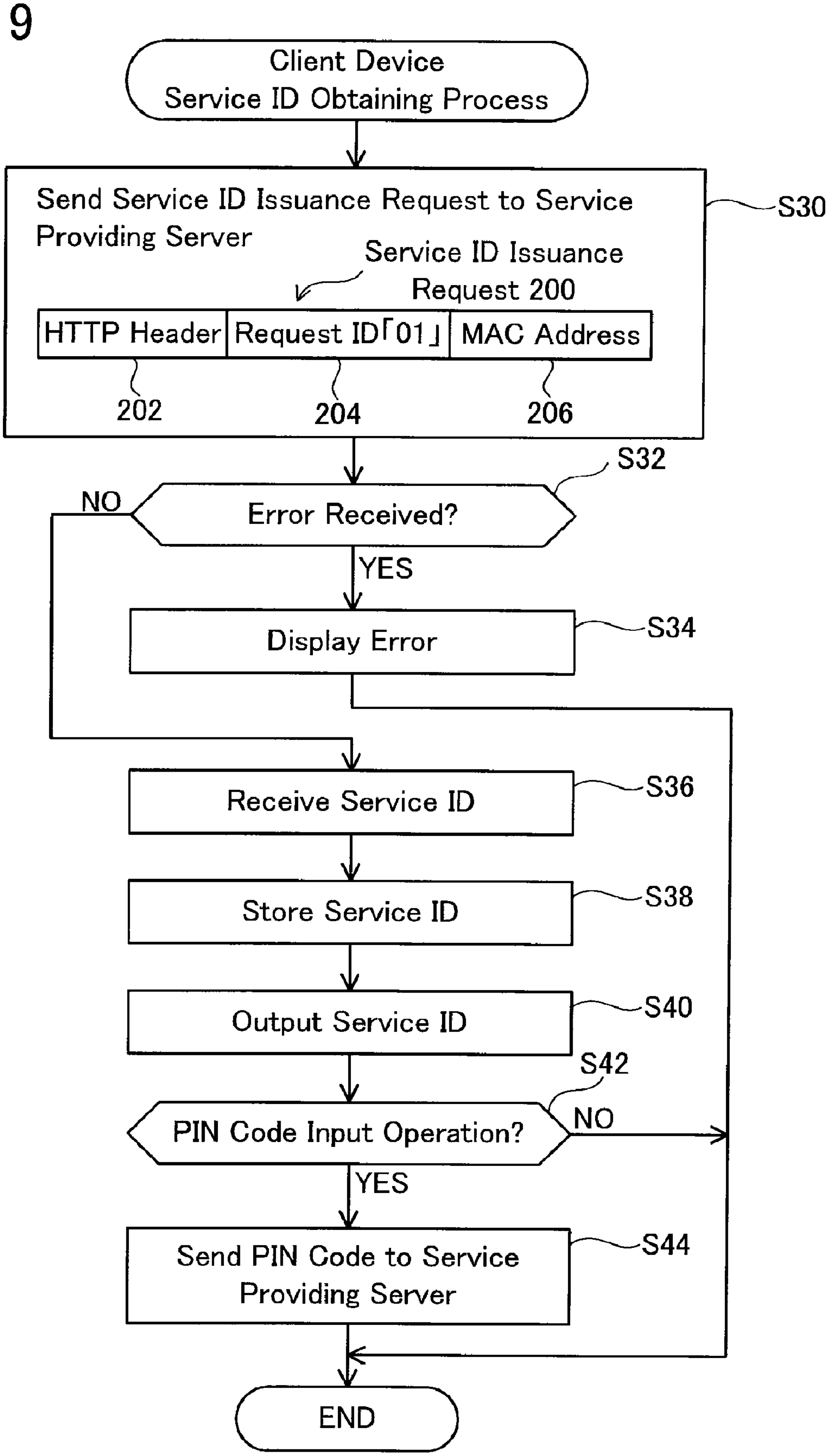
FIG. 9 shows a flow chart of a service ID obtaining process of the client device.

Next, the service ID obtaining process (the process of S14 of FIG. 8) will be described. FIG. 9 shows a flow chart of the service ID obtaining process. The control portion 18 sends a service ID issuance request (an example of an "identification information-sending request") to the service providing server 70 (S30). In S30 of FIG. 9, the schematic data configuration of a service ID issuance request 200 is shown. The service ID issuance request 200 includes an HTTP header 202, a request ID 204, and a MAC address 206. The request ID 204 is an ID for identifying a request to be sent to the service providing server 70. "01" has been adopted as the request ID 204 in the service ID issuance request 200. The MAC address 206 (an example of a "device specifying information") is an ID for specifying the 'sender' client device 10 that sends the service ID issuance request 200.

Although this will be described in detail later, the service providing server 70 performs decisions when the service ID issuance request 200 has been received. As a result, the service providing server 70 may send an error to the client device 10 which is the sender of the service ID issuance request 200. Hence, the control portion 18 of the client device 10 monitors whether an error has been received (S32). In the case of YES in S32, the control portion 18 displays an error message on the display portion 12 (see FIG. 2) (S34). In this case, the service ID obtaining process ends.

On the other hand, in accordance with the decision result, the service providing server 70 may send the service ID to the 'sender' client device 10 of the service ID issuance request 200. In this case, the client device 10 receives the service ID (S36). The control portion 18 of the client device 10 stores the service ID received in S36 in the service ID storage area 24 (see FIG. 2) (S38). Moreover, the service ID storage area 24 is capable of storing a plurality of service IDs. Under such a configuration, the control portion 18 may delete the oldest service ID being stored in the service ID storage area 24, and may store the service ID received in S36 for purposes of being storage-effective.

Next, the control portion 18 outputs the service ID received in S36 (S40). In the present embodiment, the control portion 18 displays the service ID in the display portion 12. The user can thus learn of the service ID, and can perform an operation on the operation portion 14 in order to input a PIN code (an example of an "authentication information"). Here, a random combination of letter string may be created and input by the user. Since the PIN code is utilized herein for improving the security of data transfer, whether to input the PIN code may be determined by the individual users. In the case where the above operation has been performed, the control portion 18 determines YES in S42. In this case, the control portion 18 sends the PIN code input by the user to the service providing server 70 (S44). The service ID obtaining process thereby ends. Moreover, in the case where an operation to input a PIN code had not been performed on the operation portion 14 (NO in S42), the service ID obtaining process ends without the PIN code being sent.

(Service Receiving Process of the Client Device)

Figure 10:
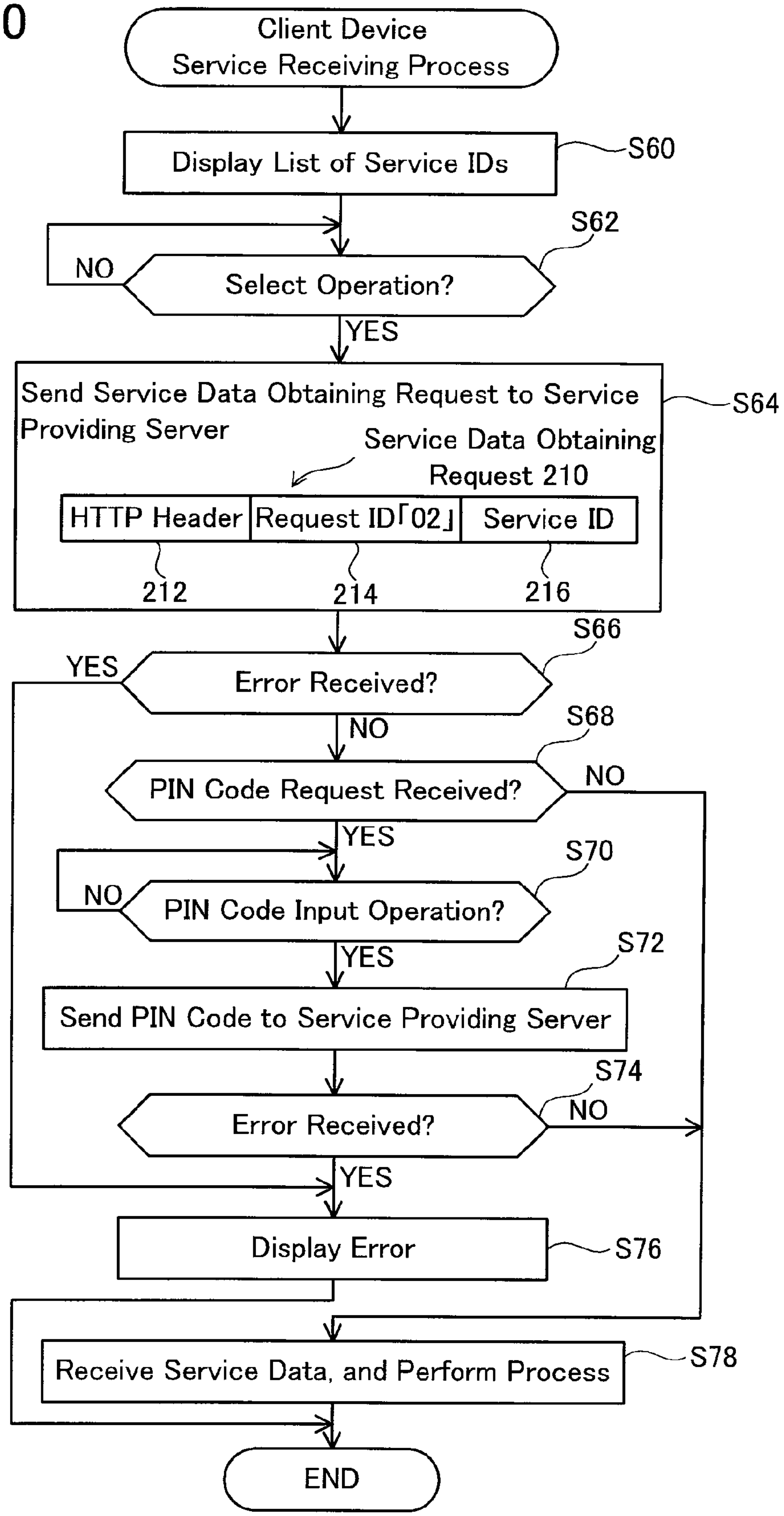
FIG. 10 shows a flow chart of a service receiving process of the client device.

Next, the service receiving process (the process of S18 of FIG. 8) will be described. FIG. 10 shows a flow chart of the service receiving process. It should be noted that this process is carried out after the processes in the information terminal 10 and the service providing server 70 (described later) for designating the desired service to the service ID that had been provided to the user in the aforementioned processes have been carried out. First, the control portion 18 displays a list on the display portion 12 of the service IDs that are being stored in the service ID storage area 24 (S60). The user can choose a service ID (e.g. "abcd0004") from the list of service IDs displayed on the display portion 12 by operating the operation portion 14. In this case, the control portion 18 determines YES in S62. Next, the control portion 18 sends the service data obtaining request to the service providing server 70 (S64). The data configuration of the service data obtaining request 210 is shown in S64 of FIG. 10. The service data obtaining request 210 includes an HTTP header 212, a request ID 214, and a service ID 216. "02" has been adopted as the request ID 214 in the service data obtaining request 210. The service ID 216 is the service ID selected in S62.

Although this will be described in detail later, the service providing server 70 performs decisions when the service data obtaining request 210 has been received. As a result, the service providing server 70 may send an error to the client device 10 that is the 'sender' of the service data obtaining request 210. The control portion 18 of the client device 10 monitors whether an error has been received (S66). In the case of YES in S66, the control portion 18 displays an error message on the display portion 12 (S76). In this case, the service receiving process ends.

On the other hand, in accordance with the decision result, the service providing server 70 may send the PIN code request to the 'sender' client device 10 of the service data obtaining request 210. The control portion 18 of the client device 10 monitors whether the PIN code request has been received (S68). In the case of YES in S68, the control portion 18 prompts the user to input the PIN code (for example, by displaying a command), and waits until the PIN code has been input (S70). The PIN code required herein is the PIN code that the user had assigned in S42. The user can perform the operation to input the PIN code on the operation portion 14. In the case where this operation has been performed, the control portion 18 determines YES in S70. In this case, the control portion 18 sends the PIN code input by the user to the service providing server 70 (S72).

When the PIN code has been sent in S72, the service providing server 70 authenticates the PIN code. In the case where the service providing server 70 has not succeeded in authenticating the PIN code, an error message is sent to the 'sender' client device 10 of the PIN code (i.e. the sender of the service data obtaining request 210). The control portion 18 of the client device 10 monitors whether an error message has been received (S74). In the case of YES in S74, the control portion 18 displays an error message on the display portion 12 (S76). In this case, the service receiving process ends.

The service providing server 70 may not send the PIN code request (e.g. in cases where no PIN code has been input in relation to the service ID). In this case, the service providing server 70 sends service data (print data in the present embodiment) corresponding to the service ID 216 included in the service data obtaining request 210 to the 'sender' client device 10 of the service data obtaining request 210 (the process of associating the service ID 216 and specific service data will be described later in the process of the service providing server 70). In this case, the control portion 18 of the client device 10 determines NO in S68, and receives the service data (S78). Further, in the case of success in authenticating the PIN code, the service providing server 70 likewise sends the service data corresponding to the service ID 216 included in the service data obtaining request 210 to the 'sender' client device 10. In this case, the control portion 18 of the client device 10 determines NO in S74, and receives the service data (S78). The control portion 18 controls the print portion 16 (see FIG. 2) to print the received service data. The service receiving process thereby ends.

(Main Process of the Information Terminal)

Next, the contents of the process performed by the information terminal 40 will be described. The process below is performed by the control portion 48 (see FIG. 3) of the information terminal 40. FIG. 11 to FIG. 14 show a flow chart of the main process of the information terminal 40. The user can input commands to the information terminal 40 by operating the operation portion 44 (see FIG. 3) of the information terminal 40. The control portion 48 of the information terminal 40 monitors the operation of the operation portion 44 (S90). The operation performed in S90 may be one of, for example, an attempt to sign into (or sign out from) the service providing server 70, or an attempt to designate the desired service. In the case of the user attempting to sign in to the service providing server 70, the address of the service providing server 70 is input by the user. In this case, the control portion 48 determines YES in S92. Then, in the case where the information terminal 40 has achieved access, the service providing server 70 sends a message to the information terminal 40 that orders transmission of the user ID and the password from the information terminal 40.

Figures 15A, 15B, 15C, 15D:
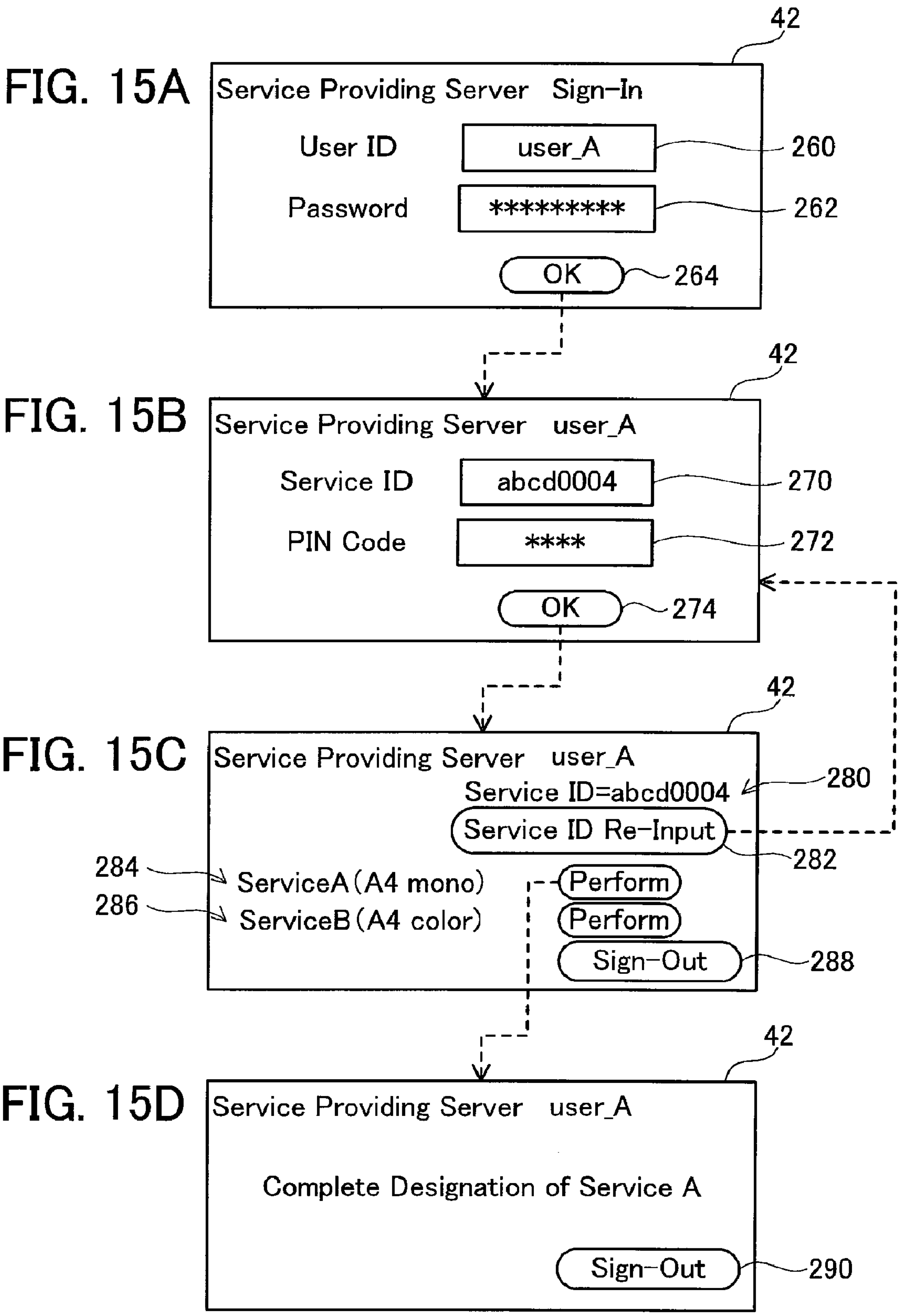
FIG. 15A to FIG. 15D show examples of the contents displayed by the information terminal.

When the above message has been received, the control portion 48 of the information terminal 40 guides the user to input the user ID and the password (for example, by displaying a command) that the user had previously registered with the service providing server 70, and waits for the user ID and the password to be input (S94). FIGS. 15A to 15D show an example of displayed contents shown consecutively on the display portion 42 (see FIG. 3) of the information terminal 40. In S94, as shown in FIG. 15A, a user ID input area 260 and a password input area 262 are shown on the display portion 42. The user can perform an operation on the operation portion 44 to input the user ID and the password. After inputting the data into the areas 260 and 262, the user can operate an OK button 264. In this case, the control portion 48 determines YES in S94.

In the case of YES in S94, the control portion 48 sends a sign-in request to the service providing server 70 (S96). The data configuration of a sign-in request 220 is shown in S96 of FIG. 11. The sign-in request 220 includes an HTTP header 222, a request ID 224, a user ID 226, and a password 228. "11" has been adopted as the request ID 224 in the sign-in request 220. The user ID 226 and the password 228 are the user ID and password input in S94.

Although this will be described in detail later, the service providing server 70 performs decisions when it has received the sign-in request 220. As a result, the service providing server 70 may send an error to the information terminal 40 that is the 'sender' of the sign-in request 220. The control portion 48 of the information terminal 40 monitors whether an error has been received (S98). In the case of YES in S98, the control portion 48 displays an error message in the display portion 42 (S106). In this case, the control portion 48 returns to S90 and monitors the further operation of the user.

In the case where an error has not been received from the service providing server 70 (the case of NO in S98), the user can proceed to perform an operation on the operation portion 44 to input the service ID that had previously been assigned to the user. In this state, as shown in FIG. 15B, a service ID input area 270 is displayed on the display portion 42. The user can perform an operation on the operation portion 44 to input the service ID. After inputting data to the area 270, the user can perform an operation to press an OK button 274. In this case, the control portion 48 determines YES in S100.

In the case of YES in S100, the control portion 48 sends a service list request to the service providing server 70 (S 102). The data configuration of a service list request 230 is shown in S102 of FIG. 11. The service list request 230 includes an HTTP header 232, a request ID 234, and a service ID 236. "13" has been adopted as the request ID 234 in the service list request 230. The service ID 236 is the service ID that had been input in S100.

Although this will be described in detail later, when the service list request 230 has been received, the service providing server 70 performs decisions. As a result, the service providing server 70 may send an error to the information terminal 40 that is the sender of the service list request 230. The control portion 48 of the information terminal 40 monitors whether an error has been received (S104). In the case of YES in S104, the control portion 48 displays an error message on the display portion 42 (S106). In this case, the control portion 48 returns to S90 and monitors the operation of the user.

In addition and simultaneously to the above process, the service providing server 70 may send a PIN code request to the information terminal 40 that is the destination of the service list request 230. The control portion 48 of the information terminal 40 monitors whether the PIN code request has been received (S120 of FIG. 12). In the case of YES in S120, the control portion 48 guides the user to input the PIN code (for example, by displaying a command), and waits for the PIN code to be input (S122). The PIN code required herein is the same as that the user had previously set in S42 in the client device 10. In S122, as shown in FIG. 15B, a PIN code input area 272 is shown on the display portion 42. The user can perform an operation on the operation portion 44 to input the PIN code. After inputting the data into the area 272, the user can operate the OK button 274. In this case, the control portion 48 determines YES in S122. In the case of YES in S122, the control portion 48 sends the PIN code input by the user to the service providing server 70 (S124).

When the PIN code has been sent in S124, the PIN code is authenticated by the service providing server 70. In the case where the service providing server 70 was unsuccessful in authenticating the PIN code, the service providing server 70 sends an error information to the 'sender' information terminal 40 of the PIN code (i.e. the sender of the service list request 230). The control portion 48 of the information terminal 40 monitors whether an error has been received (S126). In the case of YES in S126, the control portion 48 displays an error message on the display portion 42 (S128). In this case, the control portion 48 returns to S90 and monitors the operation of the user.

The service providing server 70 may not send the PIN code request (e.g. in cases where no PIN code has been set in relation to the service ID). In this case, the service providing server 70 sends a service list (information for designating service) corresponding to the service ID 236 included in the service list request 230 to the 'sender' information terminal 40 of the service list request 230. In this case, the control portion 48 of the information terminal 40 determines NO in S120, and receives the service list (S130). Though will be described in detail later, the service list includes services that can be utilized in the client device 10 of which the user intends to utilize in enjoying the service (e.g. the client device 10 with which the user had obtained the service ID). Further, in the case where the authentication of the PIN code was successful, the service providing server 70 likewise sends the service list corresponding to the service ID 236 included in the service list request 230 to the 'sender' information terminal 40 of the service list request 230. In this case, the control portion 48 of the information terminal 40 determines NO in S126, and receives the service list (S130). The control portion 48 displays the received service list on the display portion 42 (S132). As shown in FIG. 15D, items 284 and 286 of the service list are displayed on the display portion 42 in the process of S132. The service list item 284 includes information showing the contents of the service (A4 mono) (an example of a "data specifying information"), and an execute button. The other service list item 286, likewise includes information showing the contents of the service (A4 color), and an execute button. In the case where an operation is performed to press the execute button of either of the service list items 284 and 286, the control portion 48 determines YES in S150 of FIG. 13 (of which the further processes will be described later).

Moreover, in the example of FIG. 15C, an area 280 showing the service ID that had been input into the area 270 of FIG. 15B, a service ID re-input button 282, and a sign-out button 288 are shown. Although this is not shown in the flow chart, in the case where the button 282 has been pressed, the control portion 48 returns to S100 of FIG. 11 and monitors whether the service ID has been input. Further, in the case where the button 288 has been pressed, the control portion 48 determines YES in S170 of FIG. 14 (of which the further processes will be described later).

Figure 11:
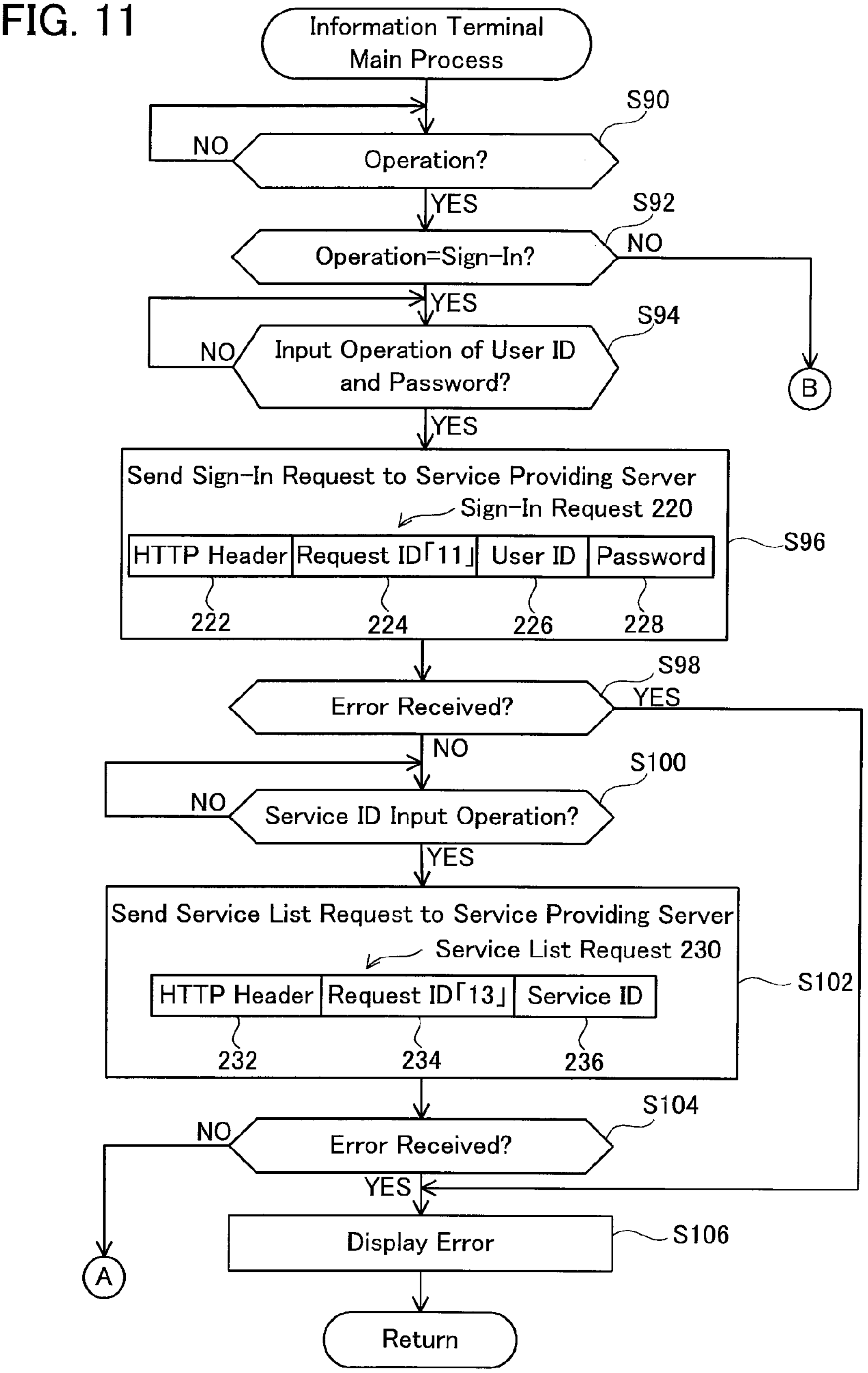
FIG. 11 shows a flow chart of a main process of the information terminal.
Figure 12:
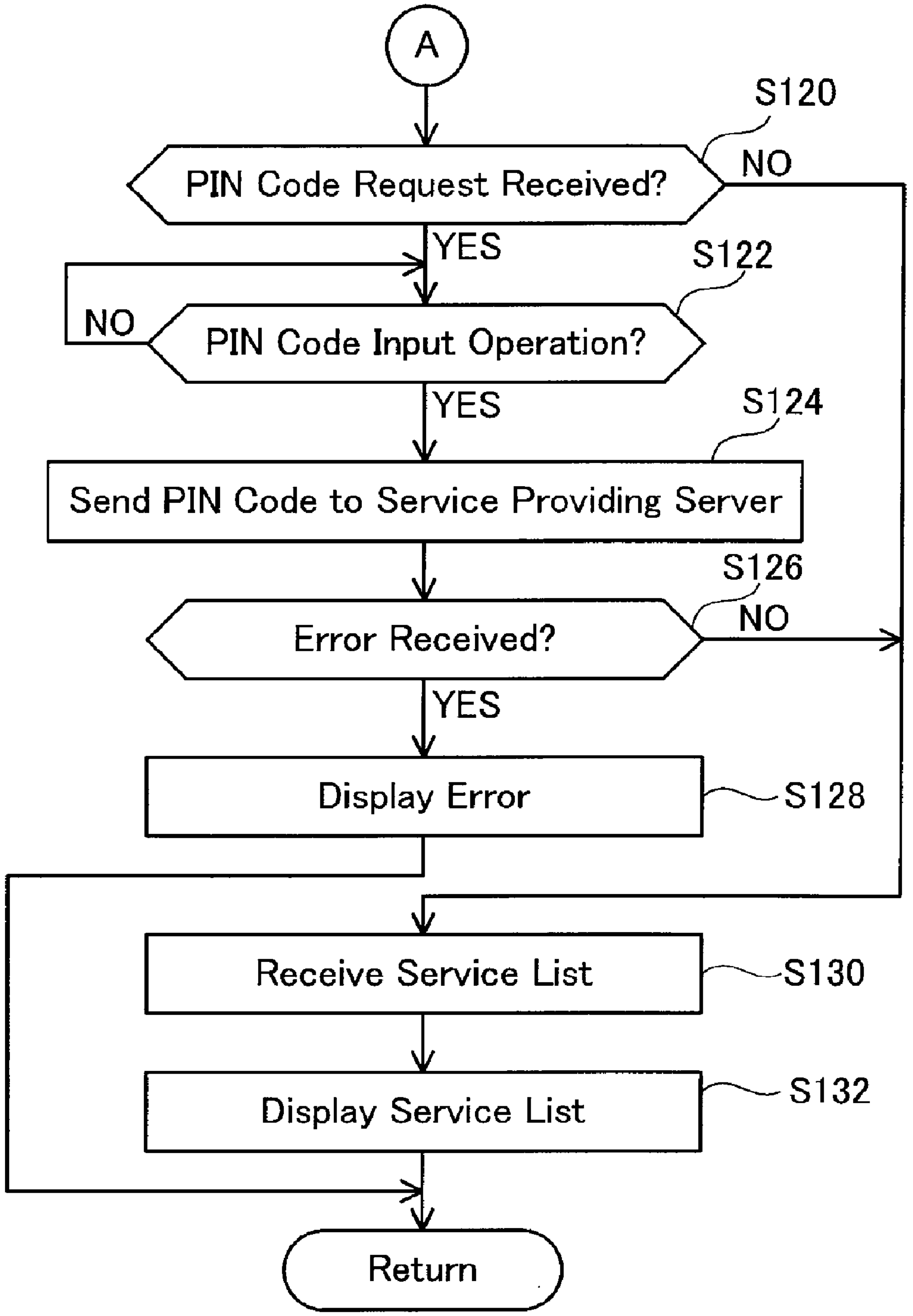
FIG. 12 shows a continuation of the flow chart of FIG. 11.
Figure 13:
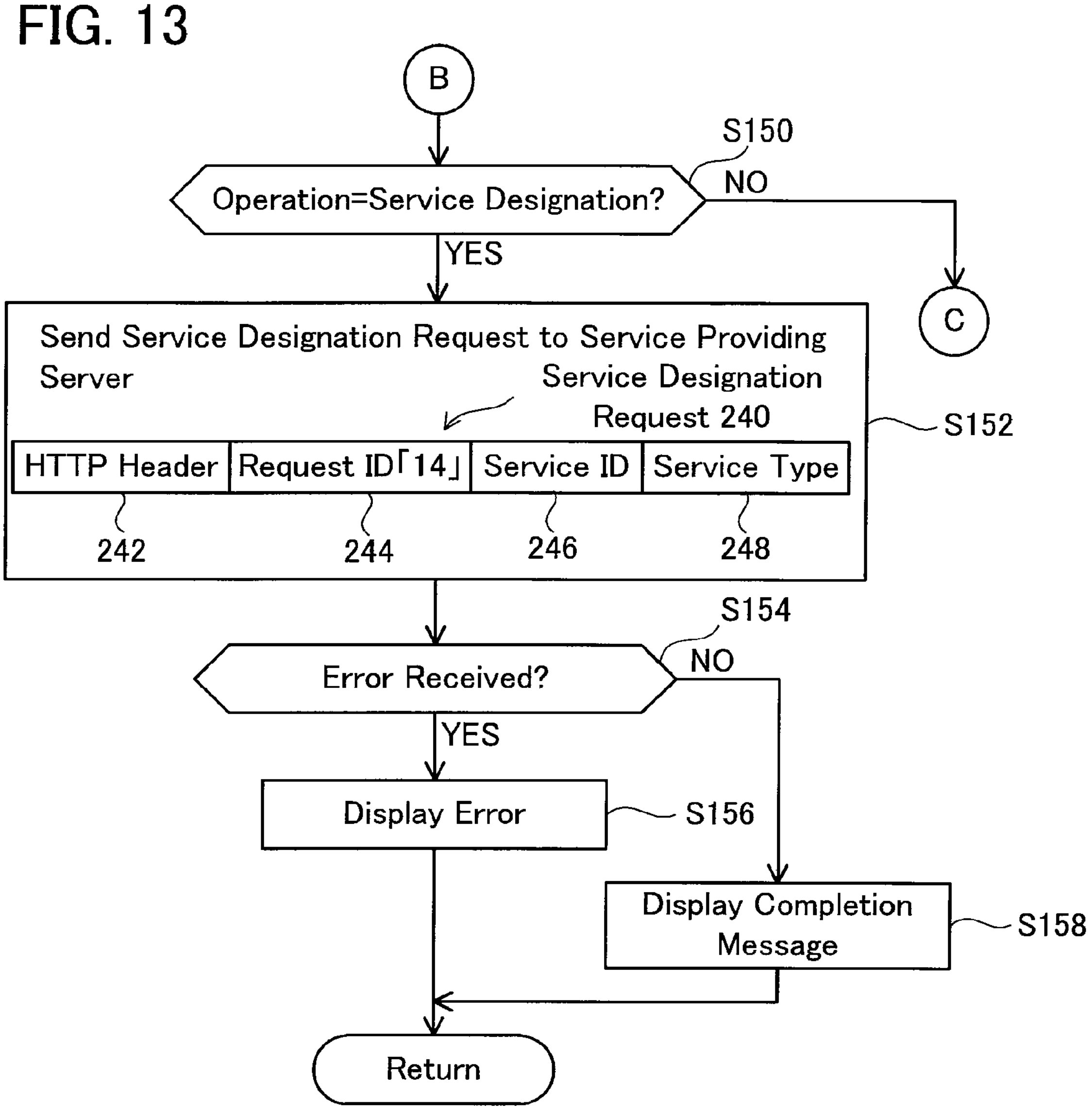
FIG. 13 shows a continuation of the flow chart of FIG. 11.

In the case of NO in S92 of FIG. 11, the process proceeds to S150 of FIG. 13. As described above, in the state where the contents shown in FIG. 15C are being displayed on the display portion 42, and the user presses the execute button of either of the service list items 284 and 286, the control portion 48 determines YES in S150, and sends a service designation request to the service providing server 70 (S152). The data configuration of a service designation request 240 is shown in S152 of FIG. 13. The service designation request 240 includes an HTTP header 242, a request ID 244, a service ID 246, and a service type 248. "14" has been adopted as the request ID 244 in the service designation request 240. The service ID 246 is the service ID that had been input in S100 of FIG. 11. More specifically, the service ID 246 is the service ID shown in the area 280 of FIG. 15C. The service type 248 is information specifying the service selected by the user in S150. For example, in the case where "Service A" has been designated as the desired service in FIG. 15C, the service type 248 is information specifying the service A (for example, A4 mono). Further, in the case where "Service B" has been selected in FIG. 15C, the service type 248 is information specifying the service B (for example, A4 color).

Although this will be described in detail later, when the service designation request 240 has been received, the service providing server 70 performs decisions. As a result, the service providing server 70 may send an error to the 'sender' information terminal 40 of the service designation request 240. The control portion 48 of the information terminal 40 monitors whether an error has been received (S154). In the case of YES in S154, the control portion 48 displays an error message on the display portion 42 (S156). In this case, the control portion 48 returns to S90 and monitors the operation of the user.

On the other hand, in the case where the process in response to the service designation request 240 (to be described later in detail) has been performed correctly, the service providing server 70 sends a completion message to the 'sender' information terminal 40. In this case, the control portion 48 of the information terminal 40 determines NO in S154, and displays the completion message on the display portion 42 (S158). FIG. 15D shows an example of a completion message. When S158 ends, the control portion 48 returns to S90 and monitors the operation of the user. Moreover, a sign-out button 290 is shown in FIG. 15D. In the case where the button 290 has been pushed, the control portion 48 determines YES in S170 of FIG. 14 (of which the further processes will be described later). With the aforementioned processes, the user is able to see the details of each of the services while being liberated from time restrictions, and designate the most favorable service which the user wishes to make use of in the client device 10.

Figure 14:
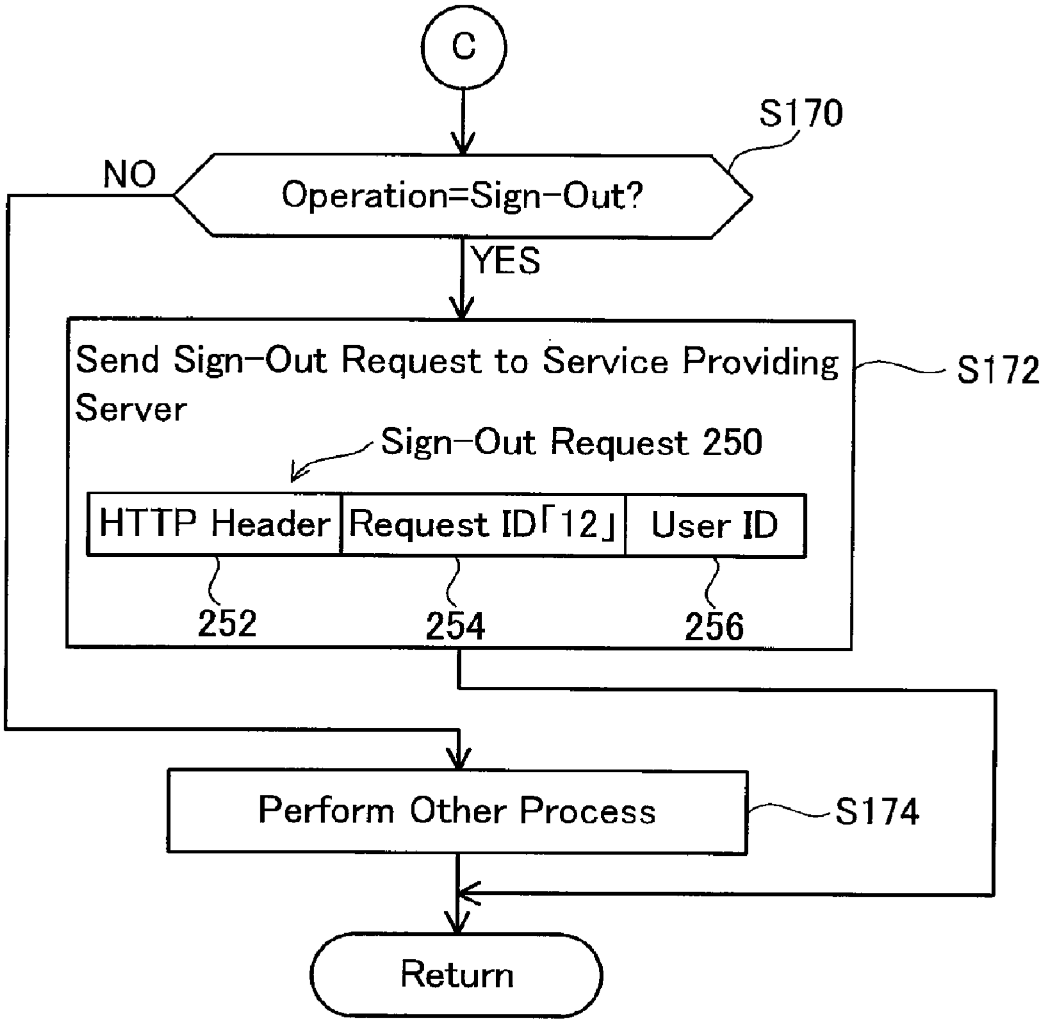
FIG. 14 shows a continuation of the flow chart of FIG. 13.

In the case of NO in SI 50 of FIG. 13, the process proceeds to S170 of FIG. 14. As described above, in the state where the contents of FIG. 15C or FIG. 15D are being displayed on the display portion 42, and the user presses one of the buttons 288 and 290 in order to sign out, the control portion 48 determines YES in S170, and sends a sign-out request to the service providing server 70 (S172). The data configuration of a sign-out request 250 is shown in S172 of FIG. 14. The sign-out request 250 includes an HTTP header 252, a request ID 254, and a user ID 256. "12" has been adopted as the request ID 254 in the sign-out request 250. The user ID 256 is the user ID input in S94 of FIG. 11. More specifically, the user ID 256 is the user ID input into the area 260 of FIG. 15A. When S172 ends, the control portion 48 returns to S90 and monitors the operation of the user. Moreover, in the case of NO in S170, the control portion 48 performs a process in accordance with an operation performed on the operation portion 44 (S174).

(Main Process of the Service Providing Server)

Figure 16:
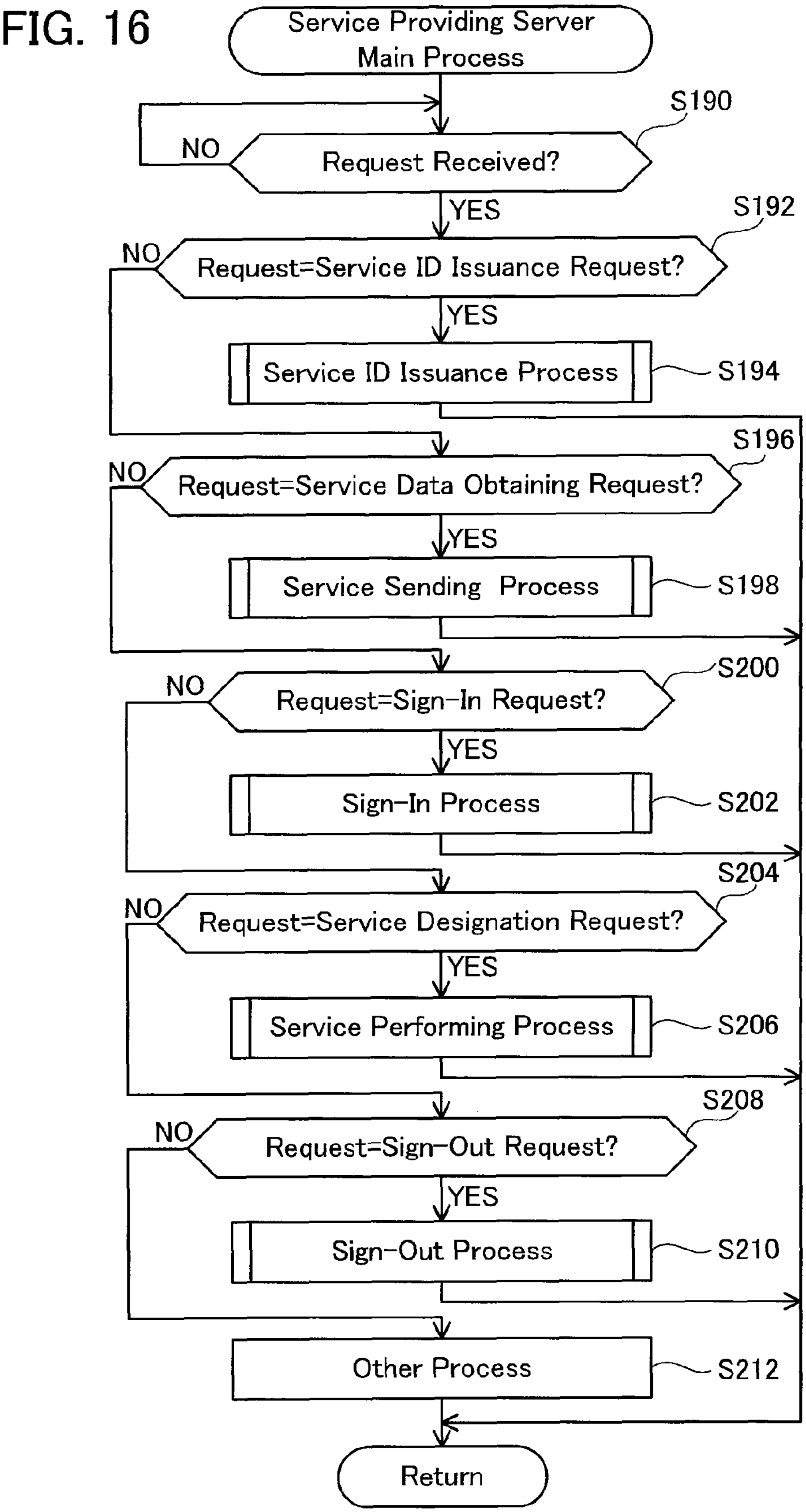
FIG. 16 shows a flow chart of a main process of the service providing server.

Next, the contents of the process performed by the service providing server 70 will be described. The process below is performed by the control portion 78 (see FIG. 4) of the service providing server 70. FIG. 16 shows a flow chart of the main process of the service providing server 70. As described above, the client device 10 or the information terminal 40 is capable of sending requests to the service providing server 70. Before this request is sent, TCP/IP packet communication is performed between the service providing server 70 and the client device 10 or the information terminal 40. A simple description of this beforehand packet communication will be given below.

Before sending the service ID issuance request (see S30 of FIG. 9), the client device 10 sends a SYN packet to the service providing server 70. In this case, the service providing server 70 sends back a SYN/ACK packet to the client device 10. Furthermore, the client device 10 then sends an ACK packet to the service providing server 70. A communication session between the client device 10 and the service providing server 70 is thus established. In this state, the client device 10 sends the service ID issuance request to the service providing server 70.

Further, the client device 10 sends the SYN packet to the service providing server 70 before sending the service data obtaining request (see S64 of FIG. 10). In this case, as with the case above, the communication of the SYN/ACK packet and the ACK packet is further performed between the client device 10 and the service providing server 70. A communication session between the client device 10 and the service providing server 70 is thus established. In this state, the client device 10 sends the service data obtaining request to the service providing server 70.

Further, the information terminal 40 also sends the SYN packet to the service providing server 70 before sending the sign-in request (see S96 of FIG. 11). In this case, as with the cases above, the communication of the SYN/ACK packet and the ACK packet is performed between the information terminal 40 and the service providing server 70. A communication session between the information terminal 40 and the service providing server 70 is thus established. In this state, the information terminal 40 sends the sign-in request to the service providing server 70.

Moreover, at the time when the information terminal 40 is to send the service designation request (see S152 of FIG. 13) or the sign-out request (see S172 of FIG. 14) to the service providing server 70, a communication session is established between the information terminal 40 and the service providing server 70 in the respective occasions. This is because a communication session has already been established since the sign-in request had been sent. As a result, in the case where the service designation request or the sign-out request is sent, the beforehand communication of the packets between the information terminal 40 and the service providing server 70 is not performed.

The control portion 78 of the service providing server 70 monitors whether a request has been received (S190). When a request has been received, the control portion 78 determines YES in S190. The control portion 78 then determines the type of the request ID included in the request received in S190, and performs a process corresponding to the type of request ID (cf request ID204 of S30 of FIG. 9). In S192, the control portion 78 determines whether the request received in S190 is the service ID issuance request (see S30 of FIG. 9). That is, the control portion 78 determines whether the request ID 204 included in the request 200 received in S190 is “01”. In the case of YES in S192, the control portion 78 performs the service ID issuance process (S194). In the case of NO in S192, the control portion 78 determines whether the request received in S190 is the service data obtaining request (see S64 of FIG. 10) (S196). That is, the control portion 78 determines whether the request ID 214 included in the request 210 received in S190 is “02” (see S64 of FIG. 10). In the case of YES in S196, the control portion 78 performs the service sending process (S198).

In the case of NO in S196, the control portion 78 determines whether the request received in S190 is the sign-in request (see S96 of FIG. 11) (S200). That is, the control portion 78 determines whether the request ID 224 included in the request 220 received in S190 is “11”. In the case of YES in S200, the control portion 78 performs the sign-in process (S202). In the case of NO in S200, the control portion 78 determines whether the request received in S190 is the service designation request (see S152 of FIG. 13) (S204). That is, the control portion 78 determines whether the request ID 244 included in the request 240 received in S190 is “14”. In the case of YES in S204, the control portion 78 performs the service performing process (S206).

In the case of NO in S204, the control portion 78 determines whether the request received in S190 is the sign-out request (see S172 of FIG. 14) (S208). That is, the control portion 78 determines whether the request ID 254 included in the request 250 received in S196 is “12”. In the case of YES in S208, the control portion 78 performs the sign-out process (S210). In the case of NO in S208, the control portion 78 performs a process in accordance with other request received in S190 (S212). The contents of the processes of S194, S198, S202, S206, and S210 will be described below in sequence.

(Service ID Issuance process of the Service Providing Server)

Figure 17:
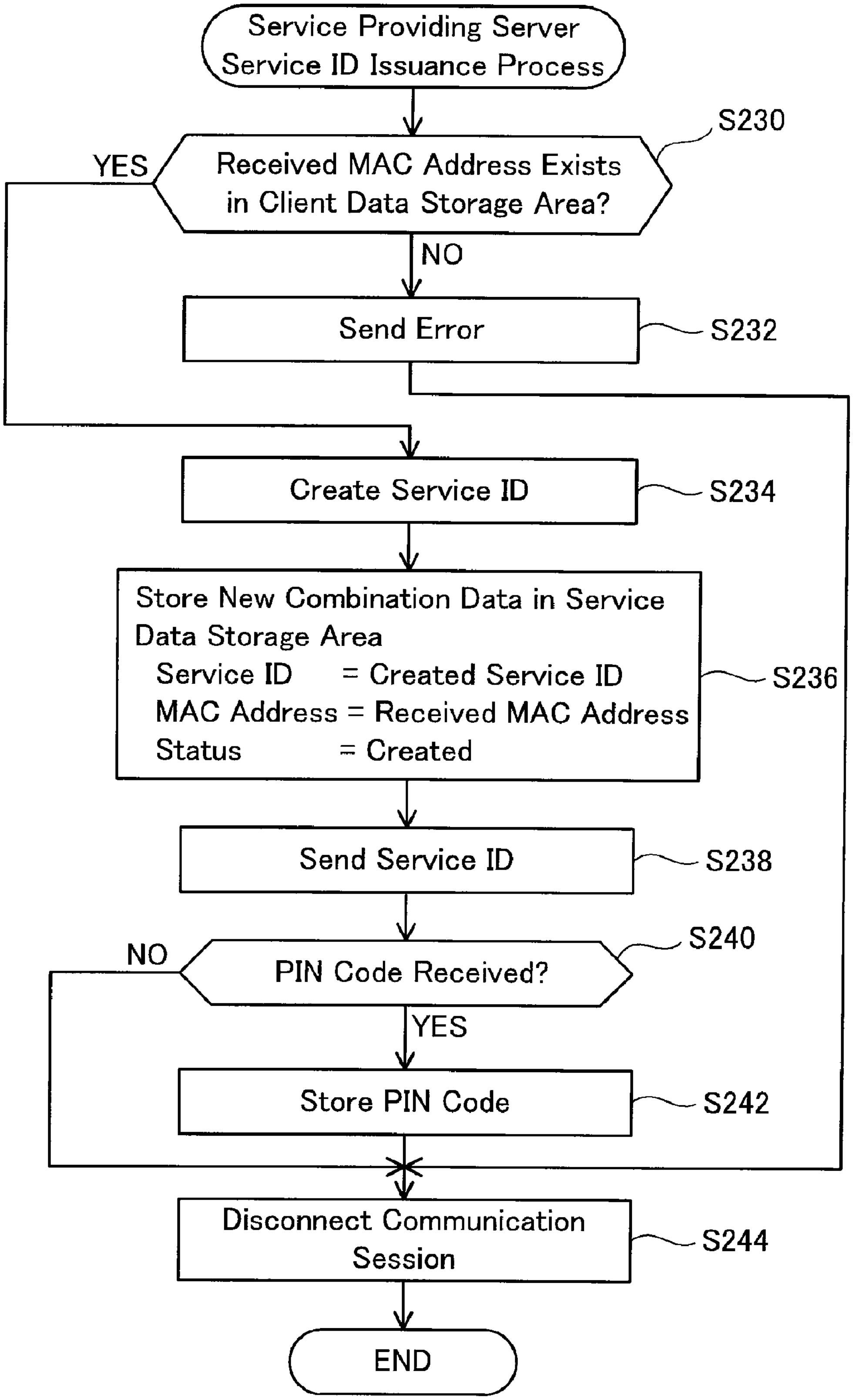
FIG. 17 shows a flow chart of a service ID issuance process of the service providing server.

Next, the service ID issuance process (the process of S194 of FIG. 16) will be described. FIG. 17 shows a flow chart of the service ID issuance process. As described above, the MAC address 206 is included in the service ID issuance request 200 (see S30 of FIG. 9). The control portion 78 determines whether the MAC address 206 included in the service ID issuance request 200 is present in the client data storage area 86 (see FIG. 6) (S230). In the case of NO in S230, the control portion 78 sends an error message to the ‘sender’ client device 10 of the service ID issuance request 200 (S232). In this case, the process proceeds to S244 (which will be described later).

On the other hand, in the case of YES in S230, the control portion 78 creates the service ID (S234). The control portion 78 creates a unique service ID. That is, the control portion 78 does not create a service ID that is the same as one of the service IDs that have been created in the past. For example, in the case where the service ID includes a number, the control portion 78 may create a new service ID by adding an increment of “1” to the serial number part of the service ID that was created previously. Further, for example, the control portion 78 may create a new service ID by randomly selecting a letter string constructed of alphabetical letters, numbers, or a combination of such) that is different from service IDs that have been created previously.

Next, the control portion 78 writes new combination data into the service data storage area 88 (see FIG. 7) (S236). Moreover, the service ID storage area 88 is capable of storing a plurality of items of combination data. The control portion 78 may delete the oldest combination data that is being stored in the service data storage area 88, and may store the new combination data. In S236, the control portion 78 writes the service ID, the MAC address, and the status of the service ID. The service ID is the service ID created in S234. The MAC address is the MAC address 206 that had been included in the service ID issuance request 200 received in S190. It may also be said that an association of the sender ID and the MAC address is stored in the storage area 88. Further, “CREATED” is written as the status. This indicates that, at this point, other items of the service data storage area 88 (the user ID 144, the PIN code 146, and the service data 150 (see FIG. 7)) are not written.

Next, the control portion 78 sends the service ID that had been created in S234 to the client device 10 that had sent the service ID issuance request 200 (S238). As described above, the PIN code may also have been sent from the client device 10 (see S44 of FIG. 9). In this case (YES in S240), the control portion 78 stores the PIN code in the service data storage area 88 (S242). That is, the control portion 78 writes the PIN code received in S240 into the PIN code column 146 (see FIG. 7) of the new combination data created in S236. It may also be said that an association of the sender ID and the PIN code is stored in the storage area 88.

In either cases where S232 has ended, NO is determined in S240, or S242 has ended, the control portion 78 performs a process to disconnect the communication session (S244). Specifically, the control portion 78 sends a FIN packet to the ‘sender’ client device 10 of the service ID issuance request 200. In this case, the client device 10 sends a FIN/ACK packet to the service providing server 70. Further, the control portion 78 then sends an ACK packet to the client device 10. The communication session between the client device 10 and the service providing server 70 is thus disconnected, and the service ID issuance process ends.

(Service Sending Process of the Service Providing Server)

Figure 18:
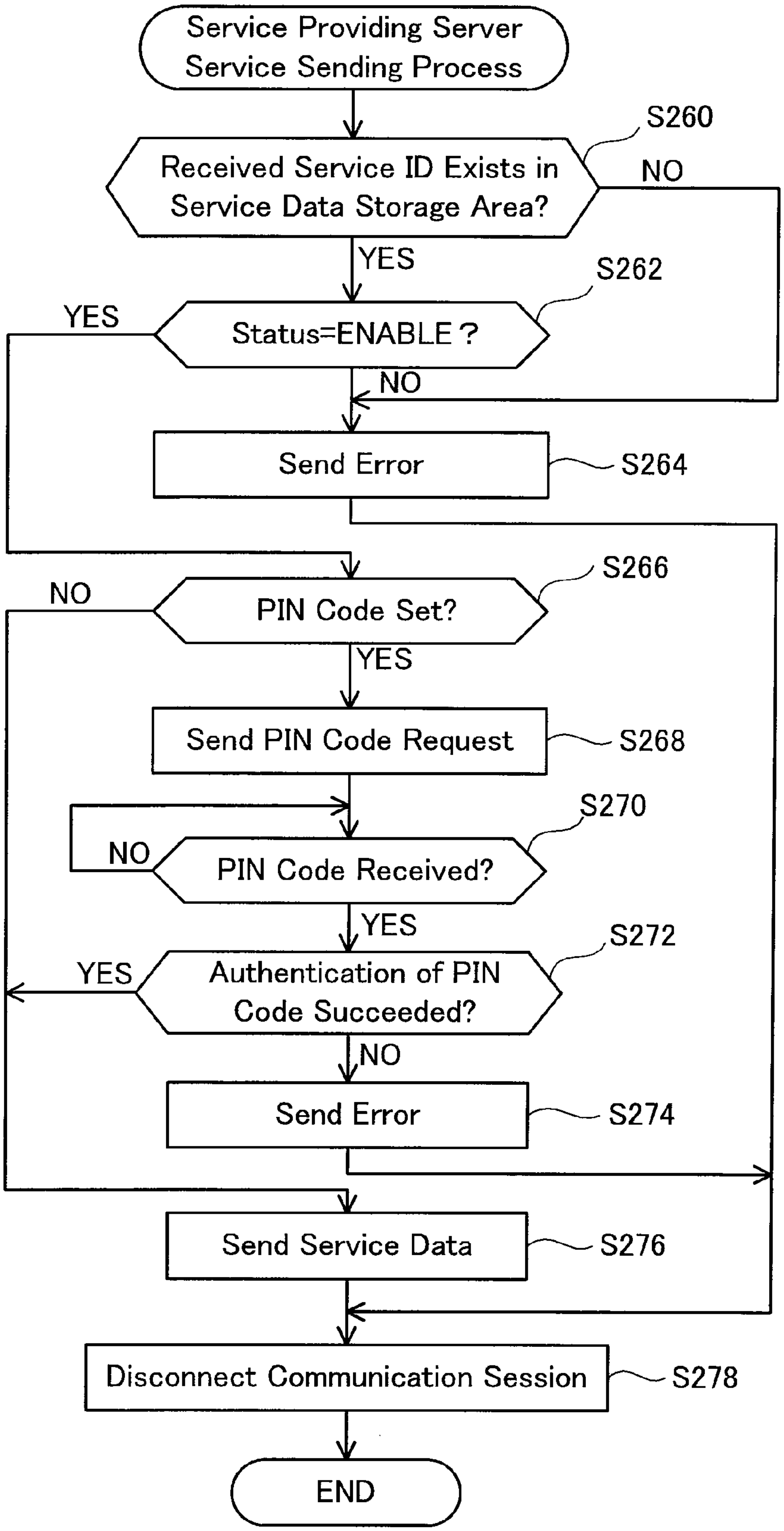
FIG. 18 shows a flow chart of a service sending process of the service providing server.

Next, the service sending process (the process of S198 of FIG. 16) will be described. FIG. 18 shows a flow chart of the service sending process. As described above, the service ID 216 is included in the service data obtaining request 210 (see S64 of FIG. 10). The control portion 78 determines whether the service ID 216 included in the service data obtaining request 210 is present in the service data storage area 88 (S260). In the case of NO in S260, the control portion 78 sends an error message to the ‘sender’ client device 10 of the request 210 (S264). In this case, the process proceeds to S278 (which will be described later).

On the other hand, in the case of YES in S260 (i.e. a match is found between the service ID 216 and one of the stored service IDs), the control portion 78 checks the stored contents of the service data storage area 88, and determines whether the status corresponding to the service ID 216 included in the service data obtaining request 210 is “ENABLE” (S262). For example, in the case where the service ID 216 is “abcd0001”, the status corresponding to the service ID 216 is “DISPOSED” as shown in FIG. 7. In this case, the control portion 78 sends an error message to the ‘sender’ client device 10 (S264). In this case, the process proceeds to S278 (as described later). Alternatively, in the case where the service ID 216 included in the service data obtaining request 210 is “abcd0004”, the status corresponding to the service ID 216 is “ENABLE” as shown in FIG. 7. In this case, the control portion 78 determines YES in S262, and the process proceeds to S266.

In S266, the control portion 78 checks the stored contents of the service data storage area 88, and determines whether the PIN code associated to the service ID 216 included in the service data obtaining request 210 has been written. In the case of YES in S266, the control portion 78 sends the PIN code request to the 'sender' client device 10 of the service data obtaining request 210 (S268). Next, the control portion 78 waits until the PIN code has been received (S270). In the case where the PIN code has been received (in the case of YES in S270), the control portion 78 authenticates the PIN code (S272). That is, the control portion 78 determines whether the PIN code corresponding to the service ID 216 included in the service data obtaining request 210 and the PIN code received in S270 are the same. In the case where the authentication of the PIN code was unsuccessful, the control portion 78 sends an error message to the 'sender' client device 10 of the request 210 (S274). In this case, the process proceeds to S278 (as described later). On the other hand, in the case where the authentication of the PIN code was successful, the process proceeds to S276. In the case of NO in S266 also, the process proceeds to S276.

In S276, the control portion 78 sends the service data to the 'sender' client device 10 of the service data obtaining request 210. The control portion 78 specifies the service data that is being stored in the service data storage area 88 that is associated with the service ID 216 included in the service data obtaining request 210 (the data of the column shown by the number 150 in FIG. 7). Then, the control portion 78 sends the specified service data so that it may be utilized in the client device 10. Moreover, the manner in which the service data is stored in the service data storage area 88 will be described in detail later. When S276 ends, the process proceeds to S278.

In either case where S264 has ended, S274 has ended, or S276 has ended, the control portion 78 performs a process to disconnect the communication session (S278). That is, the control portion 78 sends the FIN packet to the 'sender' client device 10 of the service data obtaining request 210. As with the communication of the FIN/ACK packet and the ACK packet described above, communication between the client device 10 and the service providing server 70 is thus performed. The communication session between the client device 10 and the service providing server 70 is thus disconnected, and the service sending process ends.

(Sign-in Process of the Service Providing Server)

Figure 19:
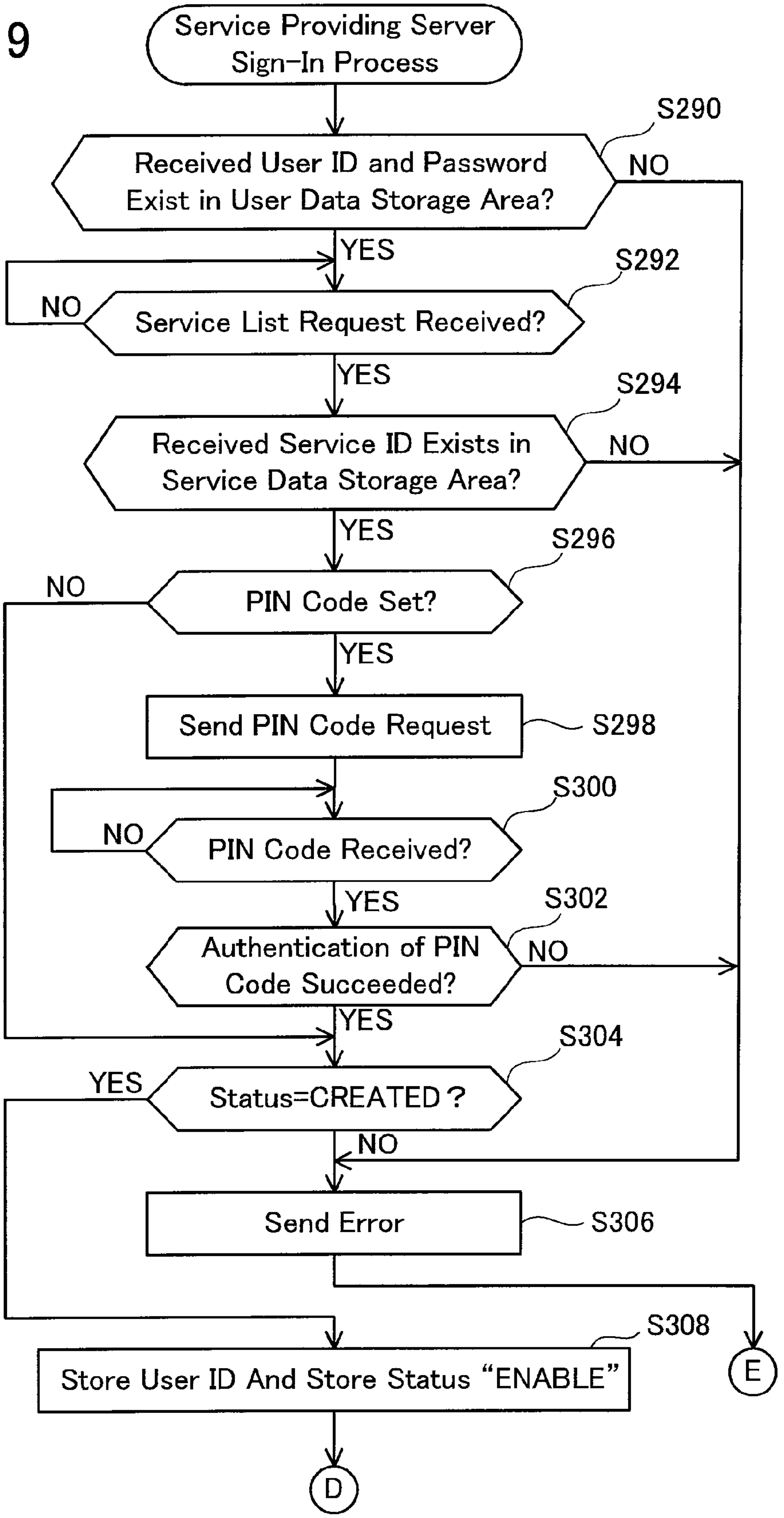
FIG. 19 shows a flow chart of a sign-in process of the service providing server.
Figure 20:
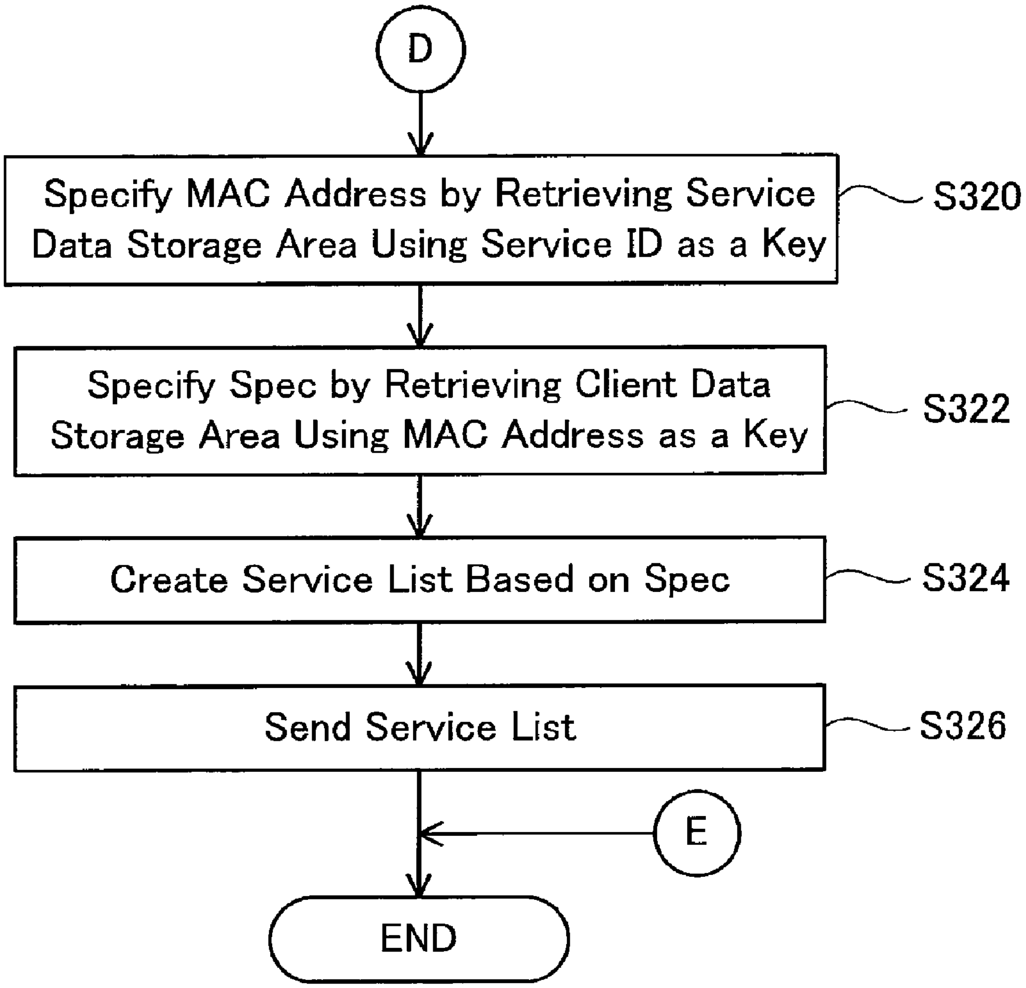
FIG. 20 shows a continuation of the flow chart of FIG. 19.

Next, the sign-in process (the process of S202 of FIG. 16) will be described. FIG. 19 and FIG. 20 show a flow chart of the sign-in process. As described above, the user ID 226 and the password 228 are included in the sign-in request 220 (see S96 of FIG. 11). The control portion 78 determines whether a combination of the user ID 226 and the password 228 included in the sign-in request 220 is present in the user data storage area 84 (see FIG. 5) (S290). In the case of NO in S290, the control portion 78 sends an error message to the information terminal 40 that is the destination of the sign-in request 220 (S306). In this case, the sign-in process ends.

On the other hand, in the case where a match is found between the received user ID and password and the stored user ID and password (YES in S290), the control portion 78 waits until the service list request has been received (S292). As described above, the information terminal 40 is capable of sending the service list request 230 to the service providing server 70 (see S102 of FIG. 11). The control portion 78 determines YES in S292 in the case where a request in which the request ID is "13" has been received. The service ID 236 is included in the service list request 230. The control portion 78 determines whether the service ID 236 included in the service list request 230 is present in the service data storage area 88 (S294). In the case of NO in S294, the control portion 78 sends an error message to the 'sender' information terminal 40 of the service list request 230 (S306). In this case, the sign-in process ends. On the other hand, in the case of YES in S294, the process proceeds to S296.

In S296, the control portion 78 checks the stored contents of the service data storage area 88, and determines whether the PIN code corresponding to the service ID 236 in the service list request 230 has been written. In the case of YES in S296, the control portion 78 sends the PIN code request to the information terminal 40 that is the destination of the service list request 230 (S298). Next, the control portion 78 waits until the PIN code has been received (S300). In the case where the PIN code has been received (in the case of YES in S300), the control portion 78 authenticates the PIN code (S302). That is, the control portion 78 determines whether the PIN code corresponding to the service ID 236 included in the service list request 230 and the PIN code received in S300 are the same. In the case where the authentication of the PIN code was unsuccessful, the control portion 78 sends an error message to the 'sender' information terminal 40 of the service list request 230 (S306). In this case, the sign-in process ends. On the other hand, in the case where the authentication of the PIN code was successful, the process proceeds to S304. In the case of NO in S296 also, the process proceeds to S304.

In S304, the control portion 78 checks the stored contents of the service data storage area 88, and determines whether the status corresponding to the service ID 236 included in the service list request 230 is "CREATED". In the case of NO in S304, the control portion 78 sends an error message to the 'sender' information terminal 40 of the request 230 (S306). In this case, the sign-in process ends. On the other hand, in the case of YES in S304, the control portion 78 writes information into the service data storage area 88 (S308). Specifically, the control portion 78 writes the user ID 226 included in the sign-in request 220 received in S190 of FIG. 16 into the user ID column 144 (see FIG. 7) as being associated with the service ID 236 included in the service list request 230. Further, the control portion 78 changes the status corresponding to the service ID 236 included in the service list request 230 (which is currently "CREATED") into "ENABLE". When S308 ends, the process proceeds to S320 of FIG. 20.

In S320, the control portion 78 checks the stored contents of the service data storage area 88, and specifies the MAC address corresponding to the service ID 236 included in the service list request 230. That is, the control portion 78 specifies the MAC address by searching the service data storage area 88 utilizing the service ID 236 included in the service list request 230 as a search key. For example, in the case where the service ID 236 included in the service list request 230 is "abcd0004", the MAC address "yy-yy-yy-yy-yy-yy" is specified among the stored contents of FIG. 7.

Next, the control portion 78 checks the stored contents of the client data storage area 86, and specifies the spec associated with the MAC address that had been specified in S320 (S322). That is, the control portion 78 specifies the spec by searching the client data storage area 86 utilizing the MAC address specified in S320 as a key. For example, in the case where the MAC address specified in S320 is "yy-yy-yy-yy-yy-yy", the spec "A3, B4, A4: color" is specified in the example of FIG. 6.

Next, the control portion 78 creates the service list based on the spec specified in S322 (S324). In the present embodiment, the control portion 78 creates a combination of a print medium size that can be printed upon and a printing method (mono color or color). For example, the client device 10 that has the spec "A3, B4, A4: color" described above is capable of performing printing utilizing any of the combination of A3 color, B4 color, A4 color, A3 mono color, B4 mono color, and A4 mono color. In the case where the spec specified in S322 is "A3, B4, A4: color", the control portion 78 creates a service list in S324 that records the above six combination patterns. Further, in the case for example where the spec specified in S322 is "A4: color", the control portion 78 creates a service list (or an item to be added to the service list that had been created) in S324 that records combinations of A4 mono color and A4 color. Next, the control portion 78 sends the created service list created in S324 to the information terminal 40 that is the destination of the service list request 230 (S326). The sign-in process is thereby ended.

(Service Performing Process of the Service Providing Server)

Figure 21:
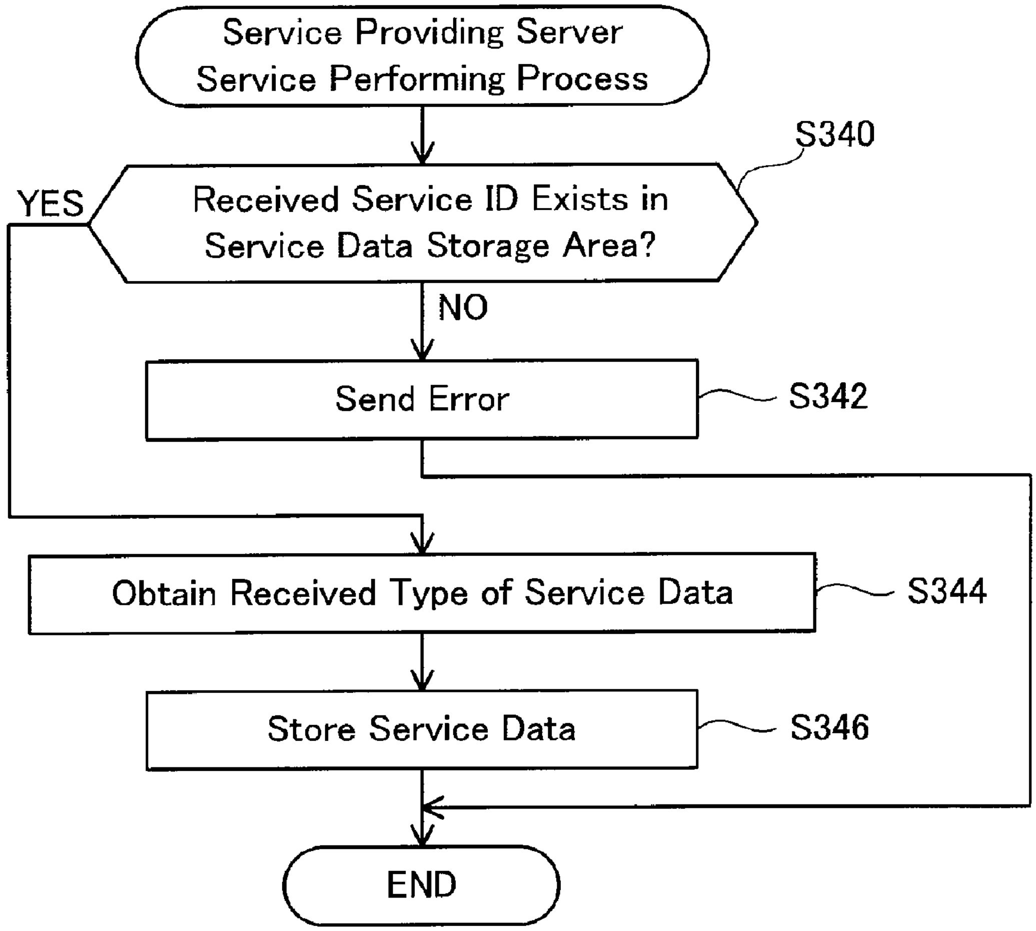
FIG. 21 shows a flow chart of a service performing process of the service providing server.

Next, the service performing process (the process of S206 of FIG. 16) will be described. FIG. 21 shows a flow chart of the service performing process. As described above, the service ID 246 and the service type 248 are included in the service designation request 240 (see S152 of FIG. 13). The control portion 78 determines whether the service ID 246 included in the service designation request 240 is present in the service data storage area 88 (S340). In the case of NO in S340, the control portion 78 sends an error message to the 'sender' information terminal 40 of the service designation request 240 (S342). In this case, the service performing process ends.

On the other hand, in the case where a match is found (YES in S340), the control portion 78 obtains the service data of the service type 248 included in the service designation request 240 (S344). For example, the service providing server 70 is storing predetermined data (this is being stored in the storage area 90 (see FIG. 4)). The control portion 78 may convert the predetermined data into print data based on the service type 248 included in the service designation request 240. That is, in the case where the service type 248 included in the service designation request 240 is A4 mono color, the control portion 78 may convert the predetermined data into print data for A4 mono color printing. Alternatively, in the case for example where the service type 248 included in the service designation request 240 is A4 color, the control portion 78 may convert the predetermined data into print data for A4 color printing. It should be noted that the service providing server 70 need not be storing the predetermined data. In this case, the control portion 78 may download data from another device on the internet 4, and may convert this data.

Next, the control portion 78 writes the service data obtained in S344 into the service data storage area 88 (S346). That is, the control portion 78 writes the service data obtained in S344 into the service data column 150 (see FIG. 7) corresponding to the service ID 246 included in the service designation request 240. Moreover, although this is not shown in the flow chart, when the process of S346 ends, the control portion 78 sends a completion message to the information terminal 40 that is the destination of the service designation request 240. When the completion message has been sent, the service performing process ends.

(Sign-out Process of the Service Providing Server)

Figure 22:
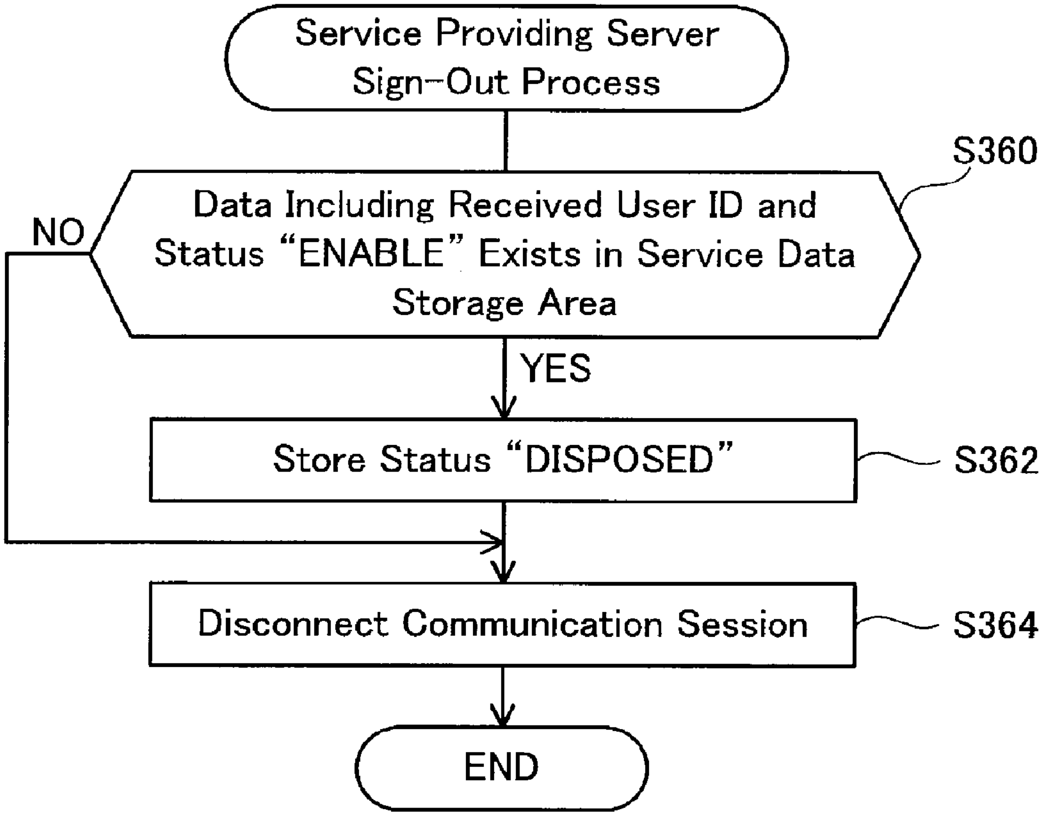
FIG. 22 shows a flow chart of a sign-out process of the service providing server.

Next, the sign-out process (the process of S210 of FIG. 16) will be described. FIG. 22 shows a flow chart of the sign-out process. As described above, the user ID 256 is included in the sign-out request 250 (see S172 of FIG. 14). The control portion 78 determines whether combination data of the user ID 256 included in the sign-out request 250 and the status "ENABLE" are present in the service data storage area 88 (S360). For example, in the case where the user ID 256 included in the sign-out request 250 is "user_A", combination data 166 of the "user_A" and the status "ENABLE" is present in the example of FIG. 7. In this case, YES is determined in S360. The control portion 78 changes the status 148 (which is currently "ENABLE") of the combination data for which YES was determined in S360 (the combination data 166 in the example above) into the status "DISPOSED" (S362).

In the case of NO in S360, or in the case where S362 has ended, the control portion 78 performs a process to disconnect the communication session (S364). That is, the control portion 78 packet sends the FIN packet to the information terminal 40 that is the destination of the sign-out request 250. As with the communication of the FIN/ACK packet and the ACK packet described above, communication between the information terminal 40 and the service providing server 70 is thus performed. The communication session between the information terminal 40 and the service providing server 70 is thus disconnected, and the sign-out process ends. The combination data whose status is changed to "DISPOSED" is no longer valid, and the service ID included therein cannot be utilized in making access to the service providing server 70 (e.g. S262 of FIG. 18). The service ID is invalidated on condition that the service ID sent from the information terminal 40 is stored in the storage area 88 of the service providing server 70, and that the sign-out request 250 has been sent from the information terminal 40 (cf. S172 of FIG. 14).

Moreover, although this is not shown in the flow chart, the control portion 78 deletes the combination data having the status "DISPOSED" at a predetermined time (for example, after a predetermined time has elapsed since the status "DISPOSED" was stored). Moreover, instead of this configuration, the control portion 78 may delete the combination data for which YES was determined in S360 of FIG. 22. In this case, the "DISPOSED" status is not utilized.

The service providing system 2 of the present embodiment has been described in detail. In this system 2, service is provided from the service providing server 70 to the client device 10 in the following sequence. When the user performs a predetermined operation on the client device 10, the service ID issuance request 200 is sent from the client device 10 to the service providing server 70 (see S30 of FIG. 9). The service providing server 70 creates a unique service ID in accordance with the issuance request, and sends this service ID back to the client device 10 (see S238 of FIG. 17). Upon carrying out the aforesaid sending process, the service providing server 70 stores the service ID (see S236 of FIG. 17). Then, the client device 10 displays the service ID sent from the service providing server 70 (see S40 of FIG. 9). The user can thus obtain the service ID. The user's operation on the client device 10 ends here for the time being.

The user can input the service ID that is known only to him/herself to the information terminal 40 (see S100 of FIG. 11). The user can, for example, input the service ID into his portable cell phone (an example of the information terminal 40). Since a third party cannot learn of the service ID, the service designating operation can be performed only by the legitimate user who inputs the correct service ID. That is, the user can designate the desired service by using the information terminal 40 (see S150 of FIG. 13). The user can leave the client device 10 while this operation is being performed. As a result, it is possible to prevent a specific user from occupying the client device 10 over a long period.

The information terminal 40 sends the service ID and the service type designated by the user to the service providing server 70 (see S152 of FIG. 13). In this case, on condition that the service ID is being stored in the service data storage area 88, the service providing server 70 stores the service data associated with that service ID (see S340, S344, and S346 of FIG. 21). Only the legitimate user capable of knowing the service ID sent from the service providing server 70 to the client device 10 can store the service data associated with that service ID in the service data storage area 88.

After the service ID and the service of which the user desires are registered in the service providing server 70 (and establish a situation in which the service data is ready for download by the client device 10), the user can select the service ID in the client device 10 (see S62 of FIG. 10). The client device 10 sends the service ID selected by the user to the service providing server 70 (see S64 of FIG. 10). In this case, the service providing server 70 sends back to the client device 10 the service data associated with the service ID from the client device 10 (see S276 of FIG. 18). The client device 10 receives and prints the service data. The data designated by the user is thus printed by the client device 10. The user can thus make use of the service that he/she had selected.

According to the system 2, the service data designated by the user can be provided to the client device 10. Further, it is possible to prevent a specific user from utilizing the client device 10 over a long period. This technique is suitable for use in a system for providing data to a device used in common by a plurality of users (as in the case with the client device 10 in the present embodiment).

Further, in the system 2, the service providing server 70 is capable of providing the user with the service list corresponding to the spec of the client device 10 (i.e. the list of printing methods of the client device 10). The user can thus learn of the service list, and can designate one item out of the items therein. Print data (services) that the client device 10 is not capable of utilizing is prevented from being provided to the client device 10.

Further, it is possible to perform various types of authentication in the system 2 of the present embodiment. For example, the client device 10 which is to be allowed the provision of the service data (print data) from the service providing server 70 is authenticated utilizing the MAC address of the client device 10 (see S230 of FIG. 17). Further, the user who is to be allowed to utilize the service data in the client device 10 is authenticated utilizing the user ID and the password (see S290 of FIG. 19). Further, when the user obtains the service ID, the user can determine the PIN code for providing the service data to the client device 10. The service providing server 70 can perform authentication utilizing this PIN code (see S272 of FIG. 18, S302 of FIG. 19). The system 2 with outstanding security is thus realized.

Further, in the present embodiment, the service data is provided from the service providing server 70 to the client device 10 only when the service ID sent from the client device 10 has been received by the service providing server 70 while the communication session between the information terminal 40 and the service providing server 70 is established. When the service data has been provided to the client device 10, the user can operate the sign-out button 290 (see FIG. 15D) in the information terminal 40. The user can thus disconnect the communication session between the information terminal 40 and the service providing server 70. In this case, the service data is not provided to the client device 10 from the service providing server 70 even if a third party were to operate the client device 10 to re-send the service ID to the service providing server 70. The system 2 with outstanding security can thus be realized. Furthermore, in the service sending process above (FIG. 18), the service ID 216 that has been sent from the client device 10 is authenticated (in S260) by determining whether the service ID 216 (specifically, a service ID identically matching the service ID 216) has previously been recorded in the service data storage area 88 of the service providing server 70. Moreover, prior to the aforesaid authentication of the service ID 216, the service ID stored in the service data storage area 88 is used in the authentication of the service ID that is sent from the information terminal 40 in the process of designating the service and its type that the user desires (specifically see, S294 in FIG. 19 and S340 in FIG. 21). This may be said that the service data is sent from the service providing server 70 to the client device 10 on condition that the service ID 246 (cf FIG. 13) sent from the information terminal 40 is being stored in the storage area 88 of the server 70, and that the service ID 216 sent from the client device 10 is received during the communication session. The service data is provided to the client device 10 only if the service IDs: the one issued and stored in the service providing server 70, the one sent from the information terminal 40, and the one sent from the client device 10, coincide with each other. This configuration provides a system in which data can be safely provided to the specific device that the legitimate user is utilizing, even if the device is shared by a plurality of people. Further, a combination use of the aforementioned service ID authentication and other authentication configurations further enhances the reliability of security in the service providing system 2.

Second Embodiment

Next, a second embodiment will be described. In the first embodiment, three statuses are utilized in the service data storage area 88 of the service providing server 70: "CREATED", "ENABLE", and "DISPOSED". In the present embodiment, the status "SUSPENDED" is utilized instead of "DISPOSED". The status "SUSPENDED" is characteristic in that the suspended service ID is not deleted even if sign out operations are carried out. That is, the status of the suspended service ID can be recovered again when the user signs in again. In the present embodiment, the contents of the sign-in process and the sign-out process performed by the service providing server 70 differ from the first embodiment. The contents of these processes will be described in sequence below.

(Sign-in Process of the Service Providing Server)

Figure 23:
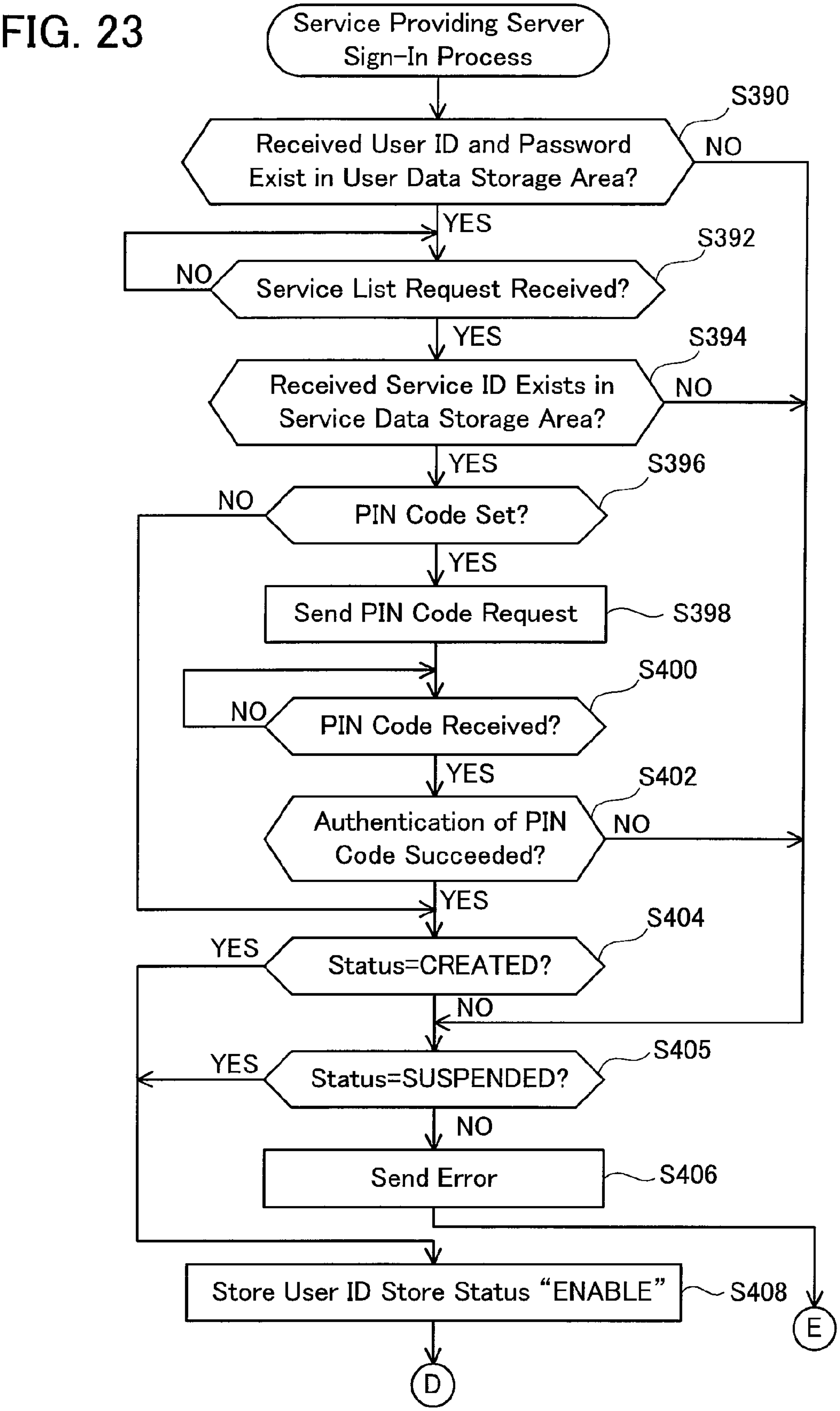
FIG. 23 shows a flow chart of a sign-in process of the service providing server (second embodiment).

First, the sign-in process of the present embodiment (the process of S202 of FIG. 16) will be described. FIG. 23 shows a flow chart of the sign-in process of the present embodiment. S390 to S404 are the same as S290 to S304 of FIG. 19. As a result, a description of S290 to S404 will be omitted. In the case of NO in S404, the control portion 78 checks the stored contents of the service data storage area 88, and determines whether the status corresponding to the service ID 236 included in the service list request 230 is "SUSPENDED" (S405). In the case of NO in S405, the control portion 78 sends an error message to the 'sender' information terminal 40 of the service list request 230 (S406). In this case, the sign-in process ends. On the other hand, in the case of YES in S405, the control portion 78 writes information into the service data storage area 88 (S408). S408 is the same as S308 of FIG. 19, and the description thereof will be omitted. When S408 ends, the process proceeds to S320 of FIG. 20. The processes from S320 of FIG. 20 and on are the same as in the first embodiment.

(Sign-out Process of the Service Providing Server)

Figure 24:
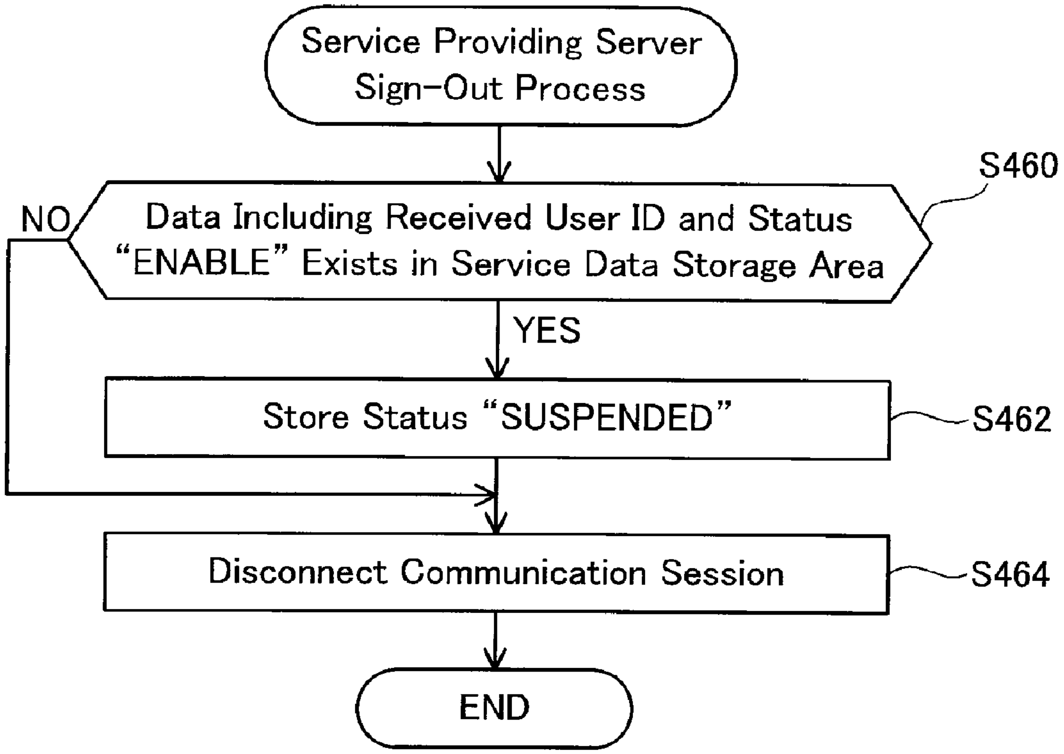
FIG. 24 shows a flow chart of a sign-out process of the service providing server (second embodiment).

Next, the sign-out process of the present embodiment (the process of S210 of FIG. 16) will be described. FIG. 24 shows a flow chart of the sign-out process of the present embodiment. S460 is the same as S360 of FIG. 22, thus the description thereof will be omitted. In the case of YES in S460, the control portion 78 changes the status 148 of the combination data for which YES was determined in S460 (the status currently being "ENABLE") to "SUSPENDED" (S462). In this case, the process proceeds to S464. Moreover, in the case of NO in S460, S462 is skipped, and the process proceeds to S464. S464 is the same as S364 of FIG. 22, thus the description thereof will be omitted.

According to the present embodiment, the service ID obtained by the user does not become invalid even if the user signs out from the information terminal 40. In the case where the user has accidentally signed out from the information terminal 40, the user can perform an operation to provide the service data to the client device 10 without re-obtaining the service ID at the client device 10.

Third Embodiment

Next, a third embodiment will be described. In the first embodiment, the client device 10 sends, in the service receiving process, the service data obtaining request that includes the HTTP header, the request ID, and the service ID to the service providing server 70 (see S64 of FIG. 10). In the present embodiment, in S64, the client device 10 sends a service data obtaining request that includes the HTTP header, the request ID, the service ID, and the MAC address to the service providing server 70.

Using the aforementioned data composition, in S260 of the service sending process (see FIG. 18), the service providing server 70 determines whether a combination data including both the service ID and the MAC address which are included in the service obtaining request that had been sent from the client device 10 is present in the service data storage area 88. In the case of YES in S260, the process proceeds to S262. In the case of NO in S260, the process proceeds to S264. The subsequent processes are the same as in the first embodiment.

In the present embodiment, data is not provided to the client device 10 if the 'receiver' client device 10 of the service ID sent from the service providing server 70 is not identical with the 'sender' client device 10 that sends the service ID to the service providing server 70. This configuration as well can be termed as one of the techniques as provided herein for authenticating the client device 10 to provide the service data from the service providing server 70. The system 2 having outstanding security is thus realized.

Fourth Embodiment

Next, a fourth embodiment will be described. In the first embodiment, the user can input the PIN code (see S42 of FIG. 9) in the service ID obtaining process of the client device 10. The service providing server 70 thus stores the PIN code associated with the service ID (see S242 of FIG. 17) in the service ID issuance process. In the present embodiment, the PIN code cannot be input in the service ID obtaining process of the client device 10. That is, the processes of S42 and S44 of FIG. 9 are not present. Instead, the user can input the PIN code in the main process of the information terminal 40 (see FIG. 11). That is, the user can input the PIN code together with the service ID in S100 of FIG. 11. In this case in S102 of FIG. 11, the information terminal 40 sends the service list request including both the service ID and the PIN code to the service providing server 70.

Furthermore, in S294 of the sign-in process (see FIG. 19), the service providing server 70 determines whether the service ID included in the service list request sent from the information terminal 40 is present in the service data storage area 88. This point is the same as in the first embodiment. In the case of YES in S294, the service providing server 70 writes the PIN code into the service data storage area 88. That is, the service providing server 70 writes the PIN code included in the service list request into the PIN code column 146 (see FIG. 7) that corresponds to the service ID included in the service list request. The PIN code is thus set. When this process ends, the process proceeds to S296. The subsequent processes are the same as in the first embodiment.

With the configuration of the present embodiment, as well, the user can determine the PIN code for providing the service data to the client device 10. The service providing server 70 can perform authentication utilizing this PIN code. The system 2 that has outstanding security can thus be realized.

Variants of the above embodiments will now be given.

(1) In the above embodiments, the service type that can be designated by the information terminal 40 is a printing function, and the service to be provided is a data stored in the service providing server for utilization in the printing function. However, the above technique exemplified in the embodiments can also be applied to other services and service types. For example, the service providing server may download data from the internet and provide the client device with the downloaded data. In this case, in S326 of FIG. 20, the service providing server may send a list of internet addresses (for example, URLs) that indicate where the data of concern is being stored. In this case, the user may designate the internet addresses at the information terminal. The information terminal may send the internet addresses designated by the user to the service providing server. In S346 of FIG. 21, the service providing server may download data from the internet addresses sent from the information terminal, and may store this data. In S276 of FIG. 18, the service providing server may send the downloaded data to the client device. In the client device (in S78 of FIG. 10), processes other than printing may be performed on the downloaded data.

(2) The client device need not be a printer device. Various devices that are provided with service from the service providing server can be adopted as the client device.

(3) In the above embodiments, the client device 10 cumulatively stores the service ID (see S38 of FIG. 9). However, when the service ID has been sent to the service providing server 70 in S64 of FIG. 10, the client device 10 may delete this service ID. Alternatively, the client device 10 may delete the service ID when a predetermined time has elapsed since the service ID was stored.

(4) The client device 10 need not store the service ID in S38 of FIG. 9. In this case, the user may input the service ID by operating the operation portion 14 of the client device 10 when the service data is to be provided to the client device 10. In S64 of FIG. 10, the client device 10 may send the service ID input by the user to the service providing server 70.

(5) In the above embodiments, the service providing server 70 disconnects the communication session (S244 of FIG. 17, S278 of FIG. 18, S364 of FIG. 22, etc.). That is, the FIN packet is sent from the service providing server 70 to the client device 10 or the information terminal 40. However, as in a vice versa situation for acquiring the same process result (i.e. disconnection of the communication session), the client device 10 or the information terminal 40 may send the FIN packet to the service providing server 70.

(6) The service providing server 70 need not obtain the service data in S344 of FIG. 21. In this case, the service providing server 70 may store an association of the service type and the service ID included in the service designation request. The service providing server 70 may obtain the service data when the service data is sent in S276 of FIG. 18. In this case, it is not necessary to store the service data in the service data storage area 88 (the service type must be stored, but the data amount thereof is smaller), and consequently the amount of data that must be stored by the service data storage area 88 can be reduced.

(7) The client device 10, the information terminal 40, and the service providing server 70 may be connected communicably by a network other than the internet 4 (by a LAN, for example).

A part of technique disclosed in the above embodiments is described below. The identification information request device may be configured to send the identification information-sending request and device specifying information of the data utilizing apparatus to the data providing apparatus. Moreover, the identification information request device may send the identification information-sending request and the device specifying information to the data providing apparatus simultaneously, or may send the identification information-sending request and the device specifying information at differing timings.

The data providing apparatus may further comprise a device spec storage device, a specifying device, and a list sending device. The device spec storage device may be configured to store, for each of a plurality of data utilizing apparatuses, an association of the device specifying information and spec specifying information of the data utilizing apparatus. Moreover, the term "spec" may also be referred to as "functions of the data utilizing apparatus". The specifying device is configured to specify the spec specifying information associated with the device specifying information sent from the data utilizing apparatus. The list sending device may be configured to send a list to the communication apparatus, whereas the list includes data specifying information corresponding to the spec specifying information specified by the specifying device. In this respect, the list may be referred as to include one or more data specifying information.

The communication apparatus may further comprise a list output device configured to output the list sent from the data providing apparatus. In this case, the data designation device may be configured to allow the user to designate at least one item of data specifying information from the list output by the list output device. According to this configuration, the data providing apparatus is capable of providing the user with a list of the data specifying information (i.e. the information used in specifying the data that the data utilizing apparatus is capable of utilizing) corresponding to the spec of the data utilizing apparatus. The user can thus learn the data that the data utilizing apparatus is capable of utilizing, and can designate at least one item of data specifying information therefrom. With the employment of the aforementioned configuration, data that the data utilizing apparatus is not capable of utilizing is prevented from being provided to the data utilizing apparatus.

Moreover, the following configuration may be adopted to provide the user with a list corresponding to the spec of the data utilizing apparatus. That is, in the case where the identification information-sending request and the device specifying information sent from the data utilizing apparatus have been received, the providing apparatus-side identification information storage device may store an association of the device specifying information and the identification information sent by the providing apparatus-side identification information sending device in accordance with the identification information-sending request. In the case where the identification information sent from the communication apparatus has been received by the data providing apparatus, the specifying device may specify the device specifying information associated with the identification information, and may further specify the spec specifying information associated with the device specifying information.

The identification information request device may be configured to send the identification information-sending request and the device specifying information of the data utilizing apparatus to the data providing apparatus. The data providing apparatus may further comprise a device specifying information storage device configured to store, for each of a plurality of data utilizing apparatuses, the device specifying information of the data utilizing apparatus. In the case where the identification information-sending request and the device specifying information sent from the data utilizing apparatus have been received, the providing apparatus-side identification information sending device may send the identification information to the data utilizing apparatus in accordance with the identification information-sending request on a condition that the device specifying information is being stored in the device specifying information storage device. This configuration can be referred to as one of a technique for authenticating the data utilizing apparatus that is to be allowed the provision of data from the data providing apparatus.

The identification information request device may be configured to send the identification information-sending request and the device specifying information of the data utilizing apparatus to the data providing apparatus. In the case where the identification information-sending request and the device specifying information sent from the data utilizing apparatus have been received, the providing apparatus-side identification information storage device may store an association of the aforesaid device specifying information and the identification information that is sent by the providing apparatus-side identification information sending device. The aforesaid identification information is sent by the providing apparatus-side identification information sending device in accordance with the identification information-sending request. The utilizing apparatus-side identification information sending device may be configured to send the identification information and the device specifying information of the data utilizing apparatus to the data providing apparatus. Moreover, the utilizing apparatus-side identification information sending device may send the identification information and the device specifying information to the data providing apparatus simultaneously, or may send the identification information and the device specifying information at differing timings. On a condition that an association of the identification information and the device specifying information sent from the data utilizing apparatus is being stored in the providing apparatus-side identification information storage device, the data sending device sends, to the data utilizing apparatus, the data specified by the data specifying information associated with the identification information. According to this configuration, the data is prohibited from being provided from the data providing apparatus to the data utilizing apparatus if the data utilizing apparatus which is of the destination of the identification information having been sent from the data providing apparatus is not identical with the data utilizing apparatus that had sent this identification information to the data providing apparatus. This configuration, as well, can be regarded as one of the technique for authenticating the data utilizing apparatus that is to be allowed the provision of data from the data providing apparatus.

The communication apparatus may further comprise a user specifying information input device configured to allow the user to input user specifying information, and a user specifying information sending device configured to send the user specifying information input into the user specifying information input device to the data providing apparatus. The data providing apparatus may further comprise a user specifying information storage device configured to store a plurality of items of user specifying information. On a condition that the user specifying information sent from the communication apparatus is being stored in the user specifying information storage device, and that the identification information sent from the communication apparatus is being stored in the providing apparatus-side identification information storage device, the first storage control device may store, in the providing apparatus-side identification information storage device, an association of the identification information and the data specifying information sent from the communication apparatus. This configuration can be called a method for authenticating the user who is to be allowed to utilize data in the data utilizing apparatus.

The data utilizing apparatus may further comprise a utilizing apparatus-side authentication information input device configured to allow a user to input authentication information. The identification information request device may be configured to send the identification information-sending request and the authentication information input into the utilizing apparatus-side authentication information input device to the data providing apparatus. Moreover, the identification information request device may send the identification information-sending request and the authentication information to the data providing apparatus simultaneously, or may send the identification information-sending request and the authentication information at differing times. In the case where the identification information-sending request and the authentication information sent from the data utilizing apparatus have been received, the providing apparatus-side identification information storage device may store an association of the authentication information and the identification information sent by the providing apparatus-side identification information sending device in accordance with the identification information-sending request. The utilizing apparatus-side identification information sending device may be configured to send, to the data providing apparatus, the identification information and the authentication information input into the utilizing apparatus-side authentication information input device. Moreover, the utilizing apparatus-side identification information sending device may send the identification information and the authentication information to the data providing apparatus simultaneously, or may send the identification information and the authentication information at differing times. On a condition that an association of the identification information and the authentication information sent from the data utilizing apparatus is being stored in the providing apparatus side apparatus-side identification information storage device, the data sending device may send the data specified by the data specifying information associated with the identification information to the data utilizing apparatus. According to this configuration, the user who obtains the identification information can determine the authentication information for sending data from the data providing apparatus to the data utilizing apparatus. A system with outstanding security can thus be realized.

The communication apparatus may further comprise a communication apparatus-side authentication information input device configured to allow the user to input authentication information. The communication apparatus-side identification information sending device may be configured to send, to the data providing apparatus, the identification information input into the identification information input device, the data specifying information designated in the data designation device, and the authentication information input into the communication apparatus-side authentication information input device. Moreover, the communication apparatus-side identification information sending device may send the identification information, the data specifying information, and the authentication information to the data providing apparatus simultaneously, or may send the identification information, the data specifying information, and the authentication information at differing times. The data providing apparatus may further comprise a second storage control device configured to store, on a condition that the identification information sent from the communication apparatus is being stored in the providing apparatus-side identification information storage device, an association of the identification information and the authentication information sent from the communication apparatus in the providing apparatus-side identification information storage device. The data utilizing apparatus may further comprise a utilizing apparatus-side authentication information input device configured to allow a user to input authentication information. The utilizing apparatus-side identification information sending device may be configured to send, to the data providing apparatus, the identification information and the authentication information input into the utilizing apparatus-side authentication information input device. On a condition that an association of the identification information and the authentication information sent from the data utilizing apparatus is being stored in the providing apparatus-side identification information storage device, the data sending device may send the data specified by the data specifying information associated with the identification information to the data utilizing apparatus. In this configuration as well, the user who obtains the identification information can determine the authentication information for sending data from the data providing apparatus to the data utilizing apparatus. A system with outstanding security can thus be realized.

The data utilizing apparatus may further comprise a utilizing apparatus-side identification information storage device configured to cumulatively store the identification information sent from the data providing apparatus, and an identification information designation device configured to allow a user to designate at least one item of identification information from a plurality of items of identification information being stored in the utilizing apparatus-side identification information storage device. The utilizing apparatus-side identification information sending device may be configured to send, to the data providing apparatus, the identification information designated in the identification information designation device. Moreover, the above configuration can also be represented as a broad concept, as shown below. That is, the data utilizing apparatus may comprise a utilizing apparatus-side identification information input device configured to allow the user to input the identification information. The utilizing apparatus-side identification information sending device may send, to the data providing apparatus, the identification information input into the utilizing apparatus-side identification information input device.

At least one of the data utilizing apparatus and the data providing apparatus may further comprise a session disconnection device configured to disconnect a communication session between the data utilizing apparatus and the data providing apparatus in the case where the identification information has been sent from the data providing apparatus to the data utilizing apparatus. According to this configuration, it is possible to reduce the communication load of the network between the data utilizing apparatus and the data providing apparatus.

Moreover, a novel data providing apparatus is taught in the present specification. This data providing apparatus is connected with both a data utilizing apparatus and a communication apparatus in a communicable manner. The data providing apparatus may comprise the providing apparatus-side identification information sending device, the providing apparatus-side identification information storage device, the first storage control device, and the data sending device. The above system can be constructed when this data providing apparatus is utilized.

Moreover, a novel computer readable medium including a computer program is taught in the present specification. This computer program may order a computer mounted on the data providing apparatus to perform the following processes:

(1) sending identification information to the data utilizing apparatus in accordance with an identification information-sending request sent from the data utilizing apparatus, (2) storing the identification information sent in the identification information sending process, (3) storing, on a condition that identification information sent from the communication apparatus is being stored in the identification information storage device, in the identification information storage device an association of the identification information and data specifying information sent from the communication apparatus, and (4) sending data to the data utilizing apparatus, the data being specified by data specifying information associated with identification information sent from the data utilizing apparatus.

A data providing apparatus for realizing the aforementioned system can be constructed when this computer program is utilized.

(1) The data utilizing apparatus may be utilized in common by a plurality of users. For example, the data utilizing apparatus may be located in a public location (an office, a shop, a hotel guest room, etc.).

(2) The devices (i.e. the data utilizing apparatus, the communication apparatus, the data providing apparatus) may each establish a communication session by means of communicating a first packet.

(3) The devices (i.e. the data utilizing apparatus, the communication apparatus, the data providing apparatus) may disconnect a communication session by means of communicating a second packet.

(4) A data utilizing apparatus as below is also useful. This data utilizing apparatus is capable of being connected communicably with the data providing apparatus. The data utilizing apparatus may comprise an identification information request device configured to send an identification information-sending request to the data providing apparatus, an identification information output device configured to output the identification information sent from the data providing apparatus, an identification information sending device configured to send the identification information to the data providing apparatus, and a data utilizing device configured to utilize the data sent from the data providing apparatus.

(5) The communication apparatus may comprise a session disconnection device configured to allow a user to disconnect a communication session with the data providing apparatus. The session disconnection device may, for example, disconnect the communication session with the data providing apparatus by sending, to the data providing apparatus, a packet for disconnecting the communication session (for example, a FIN packet in the case of TCP/IP). Further, the session disconnection device may request the data providing apparatus to disconnect the communication session. In this case, the data providing apparatus may disconnect the communication session between the data providing apparatus and the communication apparatus by sending, to the communication apparatus, a packet for disconnecting the communication session (for example, a FIN packet in the case of TCP/IP). On a condition that the identification information sent from the communication apparatus is being stored in the providing apparatus-side identification information storage device, and that the identification information sent from the data utilizing apparatus has been received during the communication session with the communication apparatus, the data sending device of the data providing apparatus may send the data specified by the data specifying information associated with the identification information to the data utilizing apparatus. According to this configuration, the data is provided from the data providing apparatus to the data utilizing apparatus only in the case where the identification information sent from the data utilizing apparatus has been received by the data providing apparatus during the communication session between the communication apparatus and the data providing apparatus. When the data utilizing apparatus has been provided with the data, the user can disconnect the communication session between the communication apparatus and the data providing apparatus utilizing the session disconnection device of the communication apparatus. In this case, the data will not be provided from the data providing apparatus to the data utilizing apparatus even if a third party were to operate the data utilizing apparatus to re-send the identification information to the data providing apparatus. A system with outstanding security can thus be realized.

(6) The data providing apparatus may further comprise an invalidation device configured to invalidate the identification information on a condition that the identification information sent from the communication apparatus is being stored in the providing apparatus-side identification information storage device, and that the communication session with the communication apparatus has been disconnected. “Invalidate” may mean that the data providing apparatus does not send data to the data utilizing apparatus even if the identification information is re-sent from the communication apparatus and the data utilizing apparatus to the data providing apparatus. The term “invalidate” should be interpreted in its broadest sense, and includes deleting the identification information, storing a predetermined status associated with the identification information (status showing invalidation), etc. According to this configuration, the identification information utilized in providing the data to the data utilizing apparatus is prevented from being re-used. After the legitimate user has provided the data to the data utilizing apparatus utilizing the identification information, a third party can be prevented from providing data to the data utilizing apparatus utilizing the same identification information.

(7) The communication apparatus may further comprise the user specifying information input device configured to allow the user to input user specifying information. The communication apparatus-side identification information sending device may send the identification information input into the identification information input device and the user specifying information input into the user specifying information input device to the data providing apparatus. The data providing apparatus may further comprise a storage control device configured to store, on a condition that the identification information sent from the communication apparatus is being stored in the providing apparatus-side identification information storage device, an association of the identification information and the user specifying information sent from the communication apparatus in the providing apparatus-side identification information storage device. The session disconnection device may send, to the data providing apparatus, the user specifying information input into the user specifying information input device, and a session disconnection request that is requesting the disconnection of the communication session. In the case where the session disconnection request and the user specifying information sent from the communication apparatus have been received, the invalidation device may invalidate the identification information associated with this user specifying information.

(8) After the identification information sent from the communication apparatus has been stored in the providing apparatus-side identification information storage device, and the communication session with the communication apparatus has been disconnected, the data sending device may send data to the data utilizing apparatus in the case where the identification information sent from the data utilizing apparatus has been received while the communication session with the communication apparatus has been re-established. That is, even if the communication session with the communication apparatus has been disconnected, the data providing apparatus does not have to invalidate the identification information. According to this configuration, the user does not have to re-obtain the identification information from the data utilizing apparatus in the case where the communication session between the communication apparatus and the data providing apparatus has been accidentally disconnected.

What is claimed is:

1. A data providing system, comprising:
a service providing server;
a client device configured to send and receive information with the service providing server; and
an information terminal configured to send and receive information with the service providing server,
the client device including:
a controller;
a storage;
a display; and
a network interface,
wherein the client device is configured to:
send a service ID request for a service ID to the service providing server;
receive a first service ID from the service providing server;
store the first service ID in the storage of the client device;
display the first service ID on the display;
send the first service ID to the service providing server; and
receive specific data to be processed from the service providing server,
the information terminal including:
a controller; and
a network interface,
wherein the information terminal is configured to:
receive user input of a second service ID;
receive user designation of data specifying information; and
send the second service ID and the data specifying information to the service providing server,
the service providing server including:
a controller;
a storage; and
a network interface,
wherein the service providing server is configured to:
send the first service ID to the client device in accordance with the service ID request received from the client device;
store the first service ID in the storage of the service providing server;
receive the second service ID and the data specifying information from the information terminal;
store an association of the second service ID and the data specifying information in the storage of the service providing server, if a first condition is met that the second service ID received from the information terminal is identical to the first service ID stored in the storage of the service providing server;
receive the first service ID from the client device; and
send to the client device the specific data specified by the data specifying information associated with the second service ID in a case where the first service ID which is identical to the second service ID is received from the client device.

2. The data providing system as in claim 1, wherein
the client device is configured to:
send the service ID request and device specifying information of the client device to the service providing server,
the service providing server is configured to:
store in the storage of the service providing server, for each of a plurality of client devices, an association of device specifying information of the client device and spec specifying information of the client device;
identify the spec specifying information associated with the device specifying information received from the client device; and
send a list to the information terminal, wherein the list includes one or more data specifying information corresponding to the identified spec specifying information,
the information terminal is configured to:
output the list received from the service providing server,
wherein the user designation includes designation of at least one item of data specifying information from the output list.

3. The data providing system as in claim 2, wherein
the service providing server is configured to:
store an association of the device specifying information of the client device and the first service ID in the storage of the service providing server, in a case where the service ID request and the device specifying information of the client device are received;
identify the device specifying information associated with the first service ID which is identical to the second service ID, in a case where the second service ID is received from the information terminal; and
identify the spec specifying information associated with the identified device specifying information.

4. The data providing system as in claim 1, wherein
the client device is configured to:
send the service ID request and device specifying information of the client device to the service providing server,
the service providing server is configured to:
store in the storage of the service providing server, for each of a plurality of client devices, device specifying information of the client device; and
send the first service ID to the client device in accordance with the service ID request, in a case where the service ID request and the device specifying information of the client device are received, and the device specifying information of the client device is being stored in the storage of the service providing server.

5. The data providing system as in claim 1, wherein
the client device is configured to:

send the service ID request and device specifying information of the client device to the service providing server, the service providing server is configured to:

store an association of the device specifying information of the client device and the first service ID in the storage of the service providing server, in a case where the service ID request and the device specifying information of the client device are received from the client device, the client device is configured to:

send the first service ID and the device specifying information of the client device to the service providing server, the service providing server is configured to:

send to the client device the specific data in a case where the first service ID which is identical to the second service ID is received from the client device, and the association of the first service ID and the device specifying information of the client device are being stored in the storage of the service providing server.

6. The data providing system as in claim 1, wherein the information terminal is configured to:

receive user input of user specifying information; and send the user specifying information to the service providing server, the service providing server is configured to:

store a plurality of user specifying information in the storage of the service providing server; and store an association of the second service ID and the data specifying information in the storage of the service providing server, if the first condition is met and a second condition is met that the user specifying information received from the information terminal is being stored in the storage of the service providing server.

7. The data providing system as in claim 1, wherein the client device is configured to:

receive user input of authentication information, send the service ID request and the authentication information to the service providing server, the service providing server is configured to:

store an association of the authentication information and the first service ID in the storage of the service providing server, in a case where the service ID request and the authentication information are received from the client device, the client device is configured to:

send the first service ID and the authentication information to the service providing server, and the service providing server is configured to:

send to the client device the specific data in a case where the first service ID which is identical to the second service ID is received from the client device, and the association of the first identification information and the authentication information is being stored in the storage of the service providing server.

8. The data providing system as in claim 1, wherein the information terminal is configured to:

receive user input of authentication information; and send the second service ID, the data specifying information, and the authentication information to the service providing server, the service providing server is configured to:

store the association of the second service ID and the authentication information received from the information terminal in the storage of the service providing server, if the first condition is met;

the client device is configured to:

receive user input of authentication information;

send the first service ID and the authentication information to the service providing server; and the service providing server is configured to:

send to the client device the specific data in a case where an association of the first service ID which is identical to the second service ID and the authentication information is being stored in the storage of the service providing server.

9. The data providing system as in claim 1, wherein the client device is configured to:

cumulatively store a plurality of service IDs received from the service providing server in the storage of the client device, wherein the user designation includes designation of the first service ID among from the plurality of service IDs.

10. The data providing system as in claim 1, wherein at least one of the client device and the service providing server is configured to:

disconnect a communication session between the client device and the service providing server in a case where the first service ID is sent from the service providing server to the client device.

11. A service providing server configured to send and receive information with a client device and an information terminal, the service providing server comprising:

a controller;

a storage; and a network interface, wherein the service providing server is configured to:

send a first service ID to the client device in accordance with a service ID request received from the client device;

store the first service ID in the storage of the service providing server;

receive a second service ID and data specifying information from the information terminal;

store an association of the second service ID and the data specifying information in the storage of the service providing server, if a first condition is met that the second service ID received from the information terminal is identical to the first service ID stored in the storage of the service providing server;

receive the first service ID from the client device; and send to the client device specific data specified by the data specifying information associated with the second service ID in a case where the first service ID which is identical to the second service ID is received from the client device.

12. A non-transitory computer readable medium that stores a computer program for a service providing server configured to send and receive information with a client device and an information terminal, the computer program including instructions for causing a controller of the service providing server to:

send a first service ID to the client device in accordance with a service ID request received from the client device;

store the first service ID in a storage of the service providing server;

receive a second service ID and data specifying information from the information terminal;

store an association of the second service ID and the data specifying information in the storage of the service providing server, if a first condition is met that the second service ID received from the information terminal is identical to the first service ID stored in the storage of the service providing server;

receive the first service ID from the client device; and send to the client device specific data specified by the data specifying information associated with the second service ID in a case where the first service ID which is identical to the second service ID is received from the client device.

* * * * *